United States Patent
Meitzen et al.

(10) Patent No.: US 7,522,876 B1
(45) Date of Patent: Apr. 21, 2009

(54) DISTRIBUTED ACCESS GATEWAY AND WIRELESS ROUTER PODS AND PUBLIC SAFETY COMMUNICATIONS INFRASTRUCTURE INCORPORATING THE SAME

(75) Inventors: Henry D. Meitzen, Colony, TX (US); Maurice L. Pipkin, Crandall, TX (US)

(73) Assignee: PHC LLC, Ardmore, OK (US)

( * ) Notice: Subject to any disclaimer, the term of this patent is extended or adjusted under 35 U.S.C. 154(b) by 377 days.

(21) Appl. No.: 11/108,388

(22) Filed: Apr. 18, 2005
(Under 37 CFR 1.47)

Related U.S. Application Data

(60) Provisional application No. 60/564,132, filed on Apr. 21, 2004.

(51) Int. Cl.
*H04B 3/36* (2006.01)

(52) U.S. Cl. .................. 455/7; 455/11.1; 455/13.1; 455/575.1; 455/90.3; 709/227; 709/217

(58) Field of Classification Search .............. 455/7, 455/11.1, 13.1, 575.1, 90.3, 128, 16; 709/227, 709/217
See application file for complete search history.

(56) References Cited

U.S. PATENT DOCUMENTS

| | | | | |
|---|---|---|---|---|
| 3,939,417 A | * | 2/1976 | Cannalte et al. ............... | 455/9 |
| 4,087,781 A | * | 5/1978 | Grossi et al. ............... | 340/853.7 |
| 5,129,096 A | * | 7/1992 | Burns ........................ | 455/18 |
| 5,386,084 A | * | 1/1995 | Risko ........................ | 174/564 |
| 5,508,589 A | * | 4/1996 | Archdekin ................. | 315/149 |
| 5,784,410 A | * | 7/1998 | Nakano ..................... | 375/345 |
| 5,801,632 A | * | 9/1998 | Opal ......................... | 340/585 |
| 5,937,332 A | * | 8/1999 | Karabinis ................. | 455/12.1 |
| 6,164,369 A | * | 12/2000 | Stoller .................. | 165/104.33 |
| 7,148,811 B1 | * | 12/2006 | Bustamante et al. ........ | 340/850 |
| 2004/0248511 A1 | * | 12/2004 | Flynn ........................ | 455/7 |
| 2005/0107033 A1 | * | 5/2005 | Kates ........................ | 455/7 |
| 2005/0135379 A1 | * | 6/2005 | Callaway et al. ........ | 370/395.31 |
| 2007/0138275 A1 | * | 6/2007 | Hall ........................... | 235/400 |

OTHER PUBLICATIONS

Beyer, "Fundamental Characteristics and Benefits of Wireless Routing ("Mesh") Networks" Communications Association International Technical Symposium, San Jose, California, Jan. 14-16, 2002.

* cited by examiner

*Primary Examiner*—Minh D Dao

(57) ABSTRACT

An access gateway/wireless router pod for a public safety communications infrastructure, a method of manufacturing the same and a public safety communications infrastructure incorporating the pod. In one embodiment, the pod includes: (1) a weather-resistant housing having a battery compartment, (2) at least one electronic module located within the housing, (3) an antenna coupled to the housing, (4) a mounting bracket couplable to the housing and configured to mount the housing to a fixture and (5) an electrical harness coupled to the housing and configured to couple the at least one electronic module to a source of electric power associated with the fixture.

14 Claims, 8 Drawing Sheets

DISTRIBUTED ACCESS GATEWAY AND WIRELESS ROUTER PODS AND PUBLIC SAFETY COMMUNICATIONS INFRASTRUCTURE INCORPORATING THE SAME

CROSS-REFERENCE TO RELATED APPLICATIONS

The present application is based on and claims the priority of U.S. Provisional Patent Application Ser. No. 60/564,132, filed Apr. 21, 2004, entitled "NexLink Access Gateway/Wireless Router Pods," commonly assigned with the present invention and incorporated herein by reference. The present application is further related to the following U.S. patent applications, commonly assigned with the present invention, filed concurrently herewith and incorporated herein by reference:

| Serial No. | Inventors | Title |
|---|---|---|
| [NXGC-0004] | Meitzen, et al. | "Device Integrated Battery Backup with Power Source Monitoring and Manipulation and Public Safety Communications Infrastructure Incorporating the Same" |
| [NXGC-0005] | Farley, et al. | "Wireless Personal Communication Device and Public Safety Communications Infrastructure Incorporating the Same" |
| [NXGC-0006] | Devlin, et al. | "Network Management Suite Dashboard and Public Safety Communications Infrastructure Incorporating the Same" |
| [NXGC-0007] | Devlin, et al. | "Network Management Suite, Device Management Services and Public Safety Communications Infrastructure Incorporating the Same" |
| [NXGC-0008] | Devlin, et al. | "Network Management Strategy Services and Public Safety Communications Infrastructure Incorporating the Same" |
| [NXGC-0009] | Farley, et al. | "Network Management Suite Talkgroup Service and Public Safety Communications Infrastructure Incorporating the Same" |

TECHNICAL FIELD OF THE INVENTION

The present invention is directed, in general, to wireless networks and, more specifically, to distributed access gateway and wireless router pods and a wireless public safety communications infrastructure incorporating the same.

BACKGROUND OF THE INVENTION

In the past century, wireless communication has evolved from an art form to science. In the early stages, people saw a cause-and-effect relationship between an electrostatic discharge and a received artifact (a smaller discharge on a disconnected device). This original understanding excited man's curiosity and experimentation. DeForest and Marconi, along with many others, translated that curiosity into a practical application of wireless communication. This technology has been evolving from the early rudimentary transmitters and receivers handling analogue voice to current digital systems handling voice and data in a seamless radio frequency network.

Traditionally, this technology has been referred to as Land Mobile Radio (LMR). In the United States, a single vendor dominates LMR technology. Characteristically, a single vendor dominated technology is slow to innovate and slow to adopt new technology. Project 25 is a set of standards produced by the joint effort of the Association of Public Safety Communications Officials (APCO), the National Telecommunications and Information Administration (NTIA) and the National Association for Telecommunications and Technology Professionals Serving State Government (NASTD) and standardized under the Telecommunications Industry Association (TIA) and represents a current LMR communication technology. Unfortunately, all current LMR communication technology, including Project 25, continues to suffer from lack of new applications.

LMR, in its current form, is a legacy technology in the mature stages of its life cycle. A basic tenet under the evolution of LMR technology was a predominant school of thought that wireless communications was best achieved over a specific frequency within the component of spectrum. This also lent itself nicely to federal management and regulation of the spectrum when demand was low.

Current systems do not provide the expanded, reliable communications communities (e.g., neighborhoods, boroughs, towns and cities) regard as necessary today, especially during disasters, natural or man-made. They do not support today's network voice, video and data requirements. They are also limited in terms of the number of simultaneous users they can accommodate. Today, interoperability, mobility, reliability, scalability and maintainability are major concerns to communities.

In recent years, the International Telecommunication Union (ITU) and the Federal Communication Commission (FCC) have begun to view radio frequency spectrum as more of a reusable resource. The results are additional frequency spectrum allocations supporting base band communication techniques allowing multiple users access to a single spectrum component (the concept of spectrum reuse). This new school of thought opens up possibilities for new digital networks to use frequency and bandwidth in ways previously inconceivable.

Unfortunately, this single concept is fundamentally incompatible with the traditional LMR systems. LMR systems use expensive repeater systems that, at best, allow two-way communications from one transmitter to many receivers with little or no concurrency.

Although LMR technology is basically the same as that used 50 years ago, it is still in use today because it meets a fundamental communication need: push-to-talk (PTT). However, it falls far short in two important areas. First, new technology now exists that may advantageously provide better interoperability. Second, LMR cannot be enhanced, adapted or evolved to meet the myriad of other communication needs of first responders, including broadband data and video.

First responders in communities would enjoy a distinct advantage by using the newer technology and retiring their LMR legacy systems. Economics and technology comparisons yield a compelling reason to make the change. Other technologies, such as cellular PTT and cellular digital packet data (CDPD) are not appropriate, because these are commercial technologies that proved a failure on Sep. 11, 2001, or will be phased out of service in 2004.

First responders have traditionally been dependent on what the major LMR vendor provided. In 1977, the LMR technology was upgraded from a simplex repeater system (developed during World War II) to a frequency hopping system (not to be confused with spread spectrum) that allowed multiple repeaters to coordinate the use of limited spectrum allocations. This new trunking system made more effective use of spectrum by time sharing across many talkgroups with intelligent radios that recognized subaudible and clear-to-send (CTS) tones that controlled the squelch and other aspects of the radio's operation.

Another major upgrade to these systems was introduced in 1987. This upgrade (called Trunking Systems II) expanded support for digital applications. The digital applications allow text messages to be transmitted and received by in-vehicle computers. These systems used existing licensed spectrum allocations and technology. The base-band technology frequency modulation (FM) is the carrier of voice and data in these systems. The drawback is that FM is not an efficient medium to transmit data.

Several years ago the ITU and the FCC allocated spectrum to unlicensed applications using spread spectrum technology in the ISM (Industrial Scientific and Medical) bands. Spread spectrum transmission and receiving technology had been developed during World War II. The technology has been slow to adopt because the coder/decoder (codec) is somewhat complex and the ITU and FCC concept of spectrum allocations date back to the Hoover administration and do not accommodate spread spectrum techniques. Originally, spread spectrum was developed to hide high-energy radar pulses in the background noise. For a number of years this was a classified application of the technology.

The technology drive for spread spectrum technology is primarily WiFi applications using the IEEE 802.11 standards. There are a number of standards in use and more to follow. These standards have been developed for non-mobile, short-range subscriber applications with relatively simple coder/decoder constructs. The evolution of these products has been the impetus driving the integrated circuit component requirements for more robust systems.

Because of the unique first responder communication requirements, the 802.11 standards are appropriate. IEEE did not design 802.11 to support the high speed mobile applications first responders require in a public safety communications infrastructure. Frequency spreading algorithms and coder/decoder components are much more complex for mobile applications.

Accordingly, what is needed in the art is a fundamentally new architecture for a public safety communications network that may serve one or more communities. What is needed in the art is a group of new devices and services that can be used alone or in combination to realize some or all of the advantages of the new architecture. More specifically, a better way to provide wireless access and routing is needed. A better way to ensure that devices are reliably powered is needed. A better wireless personal communication device is needed. A better way to manage a public safety network is needed. A better network management suite and device management services, network management strategy services and network management suite talkgroup services are also needed. Finally, a public safety communications infrastructure incorporating one or more of these aspects is needed.

SUMMARY OF THE INVENTION

To address the above-discussed deficiencies of the prior art, one aspect of the present invention provides an access gateway/wireless router pod for a public safety communications infrastructure, a method of manufacturing the same and a public safety communications infrastructure incorporating the pod. In one embodiment, the pod includes: (1) a weather-resistant housing having a battery compartment, (2) at least one electronic module located within the housing, (3) an antenna coupled to the housing, (4) a mounting bracket couplable to the housing and configured to mount the housing to a fixture and (5) an electrical harness coupled to the housing and configured to couple the at least one electronic module to a source of electric power associated with the fixture.

In another aspect, the present invention provides a method of manufacturing an access gateway/wireless router pod. In one embodiment, the method includes: (1) forming a weather-resistant housing having a battery compartment, (2) placing at least one electronic module within the housing, (3) coupling an antenna to the housing, (4) providing a mounting bracket configured to be couplable to the housing and mount the housing to a fixture and (5) coupling an electrical harness to the housing and configured to couple the at least one electronic module to a source of electric power associated with the fixture.

In yet another aspect, the present invention provides a public safety communications infrastructure. In one aspect, the infrastructure includes: (1) a wired network couplable to at least one of the Internet and the public switched telephone network and (2) a wireless network coupled to said wired network, having a plurality of wireless personal communication devices and further having a plurality of access gateway/wireless router pods configured to provide at least one of a gateway to the wired network and routing for wireless transmissions, each of the access gateway/wireless router pods including: (2a) a weather-resistant housing having a battery compartment, (2b) at least one electronic module located within the housing, (2c) an antenna coupled to the housing, (2d) a mounting bracket couplable to the housing and configured to mount the housing to a fixture and (2d) an electrical harness coupled to the housing and configured to couple the at least one electronic module to a source of electric power associated with the fixture.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

The detailed description that follows involves the external behavior of the illustrated embodiment of the infrastructure of the present invention and its defined internal components. Functional requirements, performance requirements, design constraints and other factors that potentially affect the illustrated embodiment of the infrastructure will be described.

The detailed description that follows will also cover the illustrated embodiment of the infrastructure in regards to its intended operation, product development and integration with external networks and systems. The illustrated embodiment of the infrastructure provides a mobile wireless broadband network capability that can be integrated with a community's wired network(s). The illustrated embodiment of the infrastructure carries data, voice and multimedia communications traffic and provides specific features for voice talkgroups and voice-over-Internet-Protocol (VoIP) phone calls. Additionally, the illustrated embodiment of the infrastructure provides various software applications for system users and operators to interact with and manage the system. An integral feature of the illustrated embodiment of the infrastructure is its support for voice-enabled mobile data radios and other equipment that allow mobile user access to voice and multimedia content.

The illustrated embodiment of the infrastructure represents the convergence of high-speed networking with wireless mobility at highway speed. The result is a solution that provides broadband data rates to vehicles traveling at highway speeds. The illustrated embodiment of the infrastructure also provides a complete network solution featuring seamless integration of wireless and wired network components. In the illustrated embodiment of the infrastructure, voice, video and data can be shared and transmitted without the normal bandwidth concerns usually associated with mobile wireless networks such as CDPD. In this document, the system requirements, both functional and non-functional, are summarized.

Figure 1:
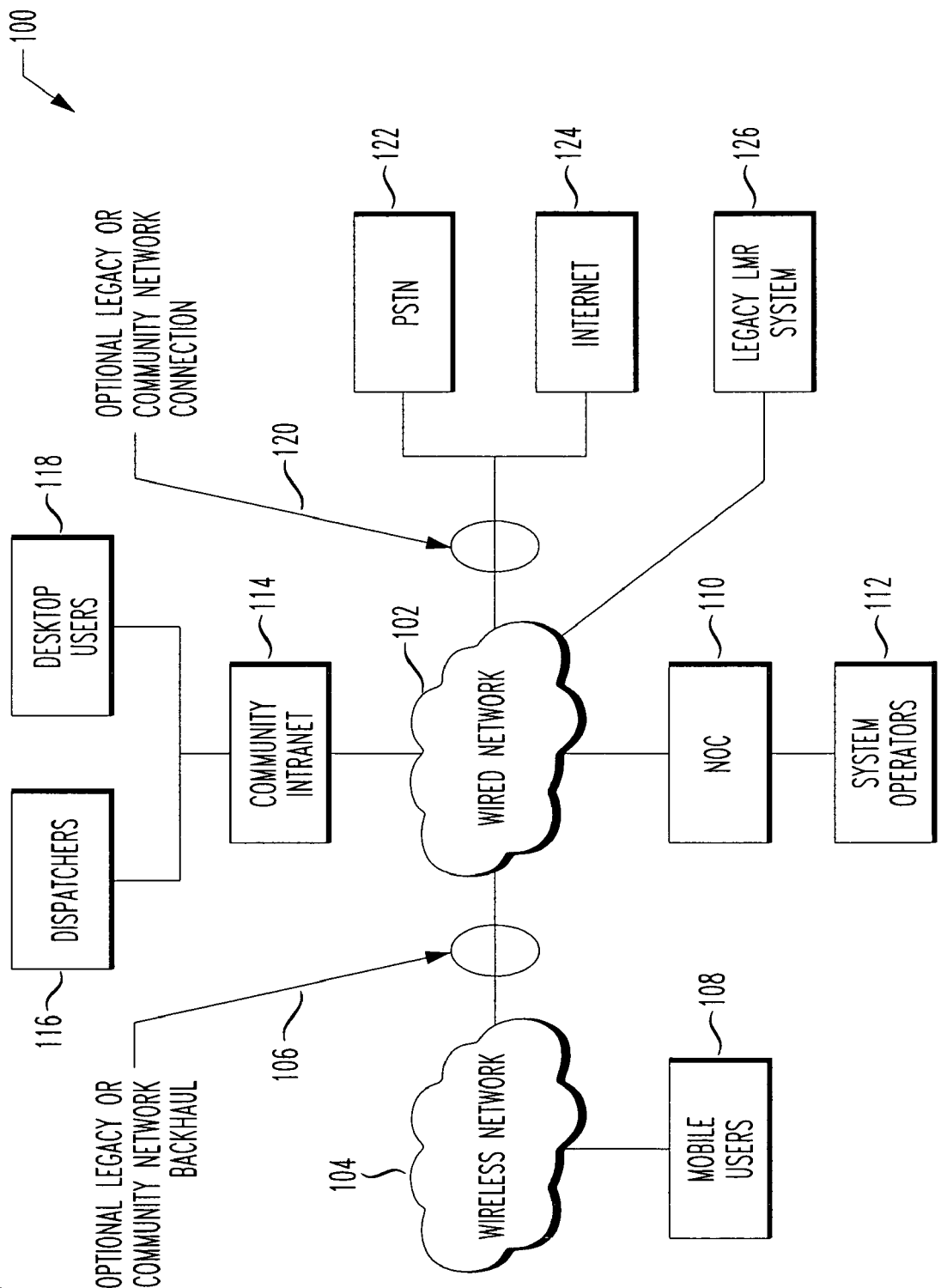
FIG. 1 illustrates a conceptual diagram of one embodiment of a public safety communications infrastructure constructed according to the principles of the present invention.

Referring initially to FIG. 1, illustrated is a conceptual diagram of one embodiment of a public safety communications infrastructure generally designated 100 and constructed according to the principles of the present invention.

The infrastructure 100 is centered about a wired network 102 and a wireless network 104 coupled thereto by a backhaul 106, which may be a legacy or community network backhaul.

The wireless network 104 has a plurality of wireless elements (not shown, but within the wireless network 104), which typically take the form of geographically distributed access gateways and wireless routers. Mobile users 108 are able to employ the wireless elements to communicate with the wired network 102. In the illustrated embodiment of the infrastructure 100, the wireless elements are capable of cooperating to form an ad hoc, or "mesh" network. Those skilled in the pertinent art are familiar with mesh networks. Nevertheless, Beyer, et al., "Fundamental Characteristics and Benefits of Wireless Routing ('Mesh') Networks," Communications Association International Technical Symposium, San Jose, Calif., Jan. 14-16, 2002, describes the structure and function of a mesh network. Motorola, Inc., of Schaumberg, Ill., is a commercial provider of elements for mesh networks and produces elements and other devices that fall within the broad scope of the present invention.

The wired network 102 is coupled to a network operations center (NOC) 110 that monitors the operation of the wired network 102, the wireless network 104 and devices coupled thereto. System operators 112 typically staff the NOC 110.

If the community in question has an intranet 114, the intranet 114 can be coupled to the wired network 104. Dispatchers 116 and desktop users 118 typically staff the customer intranet 114.

The wired network 102 can be coupled to external resources. FIG. 1 illustrates an optional legacy or community network connection 120 that couples the wired network 102 to the public switched telephone network (PSTN) 122 and the Internet 124.

The community may wish to retain its legacy LMR system. Thus, FIG. 1 illustrates a legacy LMR system 126 coupled to the wired network 102.

Some broad operational aspects of the infrastructure 100 will now be described. The infrastructure 100 is a hybrid wireless/wired system with the primary purpose of connecting the mobile users 108 to the wired network 102. By its very nature, the illustrated embodiment of the infrastructure 100 is a geographically dispersed system with wireless elements (not shown) installed approximately ½ mile apart in a pattern to provide the desired coverage throughout a target area with distributed connections to the wired network 102.

The illustrated embodiment of the infrastructure 100 is a customizable architecture that can be tailored to each community deployment. Because of this, it is difficult to account for the specific hardware and software external interfaces to the system for all possible community configurations.

As stated above, the backhaul 106 connects the wireless network 104 to the wired network 102 of the infrastructure 100. The backhaul 106 may be implemented using any media to support the wide area network needs. For example, single-mode fiber using Ethernet-to-fiber converters at the access points may be used to advantage.

The backhaul 106 may use any appropriate Layer 2 communications protocols for the media, but can advantageously support Internet Protocol (IP) communications at Layer 3. Additionally, the backhaul 106 can advantageously support the well-known Transmission Control Protocol (TCP) and User Datagram Protocol (UDP) transport protocols as well as typical Internet application protocols.

The backhaul 106 should advantageously be capable of sustaining the traffic in and among the wireless network 102 and the wired network 104. In the illustrated embodiment, the backhaul 106 is actually a distributed interface across all access points in the wireless network 104, and therefore requires multiple connections. Each access point connection provides a minimum 1.5 Mbps throughput, but all bandwidths fall within the broad scope of the present invention.

The backhaul 106 is an integral component to the entire infrastructure 100 and should be secured. The backhaul 106 should be deployed as a private network connection within the security realm of the community. However, it is possible to use virtual private network (VPN) connections over shared or public network connections, though this could limit available bandwidth. If a public network is used, a firewall should be provided to protect the infrastructure 100.

A NOC interface (not shown) couples the wired network 102 to the NOC 110. The NOC interface may be implemented using any media to support the wide area network needs but can advantageously support TCP/IP communications. Redundant leased T-1 connections are especially advantageous.

The NOC interface may use any appropriate Layer 2 communications protocols for the media, but can advantageously support IP communications at Layer 3 as well as the TCP and UDP transport protocols as well as typical Internet application protocols. The NOC interface can advantageously be on a separate routing domain and have IP connectivity to the illustrated embodiment of the infrastructure wired network routing domain.

The NOC interface is primarily a management interface and connects operator workstations to infrastructure 100 portions primarily using Simple Network Management Protocol (SNMP) and TCP/IP communications protocols. The NOC interface can advantageously provide a minimum 1.5 Mbps throughput.

The NOC interface is an integral component to the illustrated embodiment of the infrastructure with system administrators managing the elements and should advantageously be secured. The NOC interface can advantageously be deployed as a private network connection within the security realm of the community. However, it is possible to use VPN connections over shared or public network connections. The NOC interface can advantageously provide a firewall to protect the illustrated embodiment of the infrastructure from a potential threat of a compromised NOC network.

A community intranet interface (not shown) connects the wired network 102 to the community intranet 114. If the community has no assets or need for the community intranet interface, it is not deployed.

The community intranet interface may be implemented using any media to support the network needs but can advantageously support TCP/IP communications. Assuming co-located deployment in a community facility, the recommended media is an Ethernet or fiber based local-area network (LAN) connection. Wide-area network (WAN) connections may use appropriate media for the connection.

The community intranet interface may use any appropriate Layer 2 communications protocols for the media, but can advantageously support IP communications at Layer 3 as well as the TCP and UDP transport protocols as well as typical Internet application protocols. The community intranet interface should be on its own routing domain(s) that can advantageously be reachable from the illustrated embodiment of the infrastructure to maintain IP connectivity to mobile users.

The community intranet interface is primarily an application service interface and connects mobile users to community application and data servers. This interface can advantageously provide a minimum 10 Mbps throughput assuming co-located deployment, though 100 Mbps is particularly advantageous.

The community intranet interface provides a connection from the mobile users to the sensitive community network infrastructure and can advantageously be deployed as a private network connection within the security realm of the community. However, it is possible to use VPN connections over shared or public network connections. The community intranet interface can advantageously provide a firewall to protect the illustrated embodiment of the infrastructure from the community intranet.

A PSTN interface (not shown) connects the wired network 102 to the PSTN 122 to interchange VoIP telephone calls. If the community has no need for this interface, it is not deployed.

The PSTN interface may be implemented using any media to support the network needs but can advantageously support PSTN communications. The PSTN interface may use any PSTN protocols to support a VoIP gateway in its interchange with a PSTN telephone switch. The PSTN interface has no IP routing requirements.

The PSTN interface had no specific bandwidth requirement but does have requirements for the number of simultaneous calls that can advantageously be supported. This equates to the number of voice channels needed on the interface.

The PSTN interface is an interface to a public telephone system switch and therefore has no direct computer IP connection minimizing its security risk. There are no specific security requirements for the PSTN interface.

An Internet interface (not shown) connects the wired network 102 to the Internet 124. If the community has no need for the Internet interface, it is not deployed.

The Internet interface may be implemented using any media to support the network needs but can advantageously support TCP/IP communications. This interface is by nature a WAN connection and any appropriate WAN media may be used to connect to an Internet Service Provider (ISP). However, this interface may optionally go through an existing community or legacy network connection, and the appropriate media may be used for the existing connection.

The Internet interface may use any appropriate Layer 2 communications protocols for the media, but can advantageously support IP communications at Layer 3 as well as the TCP and UDP transport protocols as well as typical Internet application protocols. The Internet interface connects the private IP routing domain of the wired network to the public IP routing domain and can advantageously provide the appropriate routing resources.

The Internet interface will be bandwidth limited by the Internet and the Internet service provider. The minimum bandwidth needed is dependent on how the community plans to use the connection to the Internet, so no specified bandwidth requirement exists. An exception to this is if the Internet connection is used to tunnel one of the other interface connections over a VPN, in which case the minimum bandwidth required of the tunnel is dependent on the interface(s) carried on the Internet interface.

The Internet interface is an interface to a public shared system that is by far the biggest single security threat to the illustrated embodiment of the infrastructure 100. Because of the security risks associated with a connection to the Internet, it is important to secure the infrastructure 100 from that connection using a robust firewall product. Additional security may be gained by using intrusion detection and intrusion deterrence products. So at a minimum, the Internet interface can advantageously provide a firewall to protect the illustrated embodiment of the infrastructure from the Internet.

A legacy LMR system interface (not shown) connects the wired network 102 to the legacy LMR system 126. This interface is part of the customization of the illustrated embodiment of the infrastructure for specific community requirements. If the community has no need for this interface, it is not deployed. The legacy LMR system interface has no specific media requirements, no specific protocol requirements, no specific routing requirements, no specific bandwidth requirements and no specific security requirements.

Figure 2:
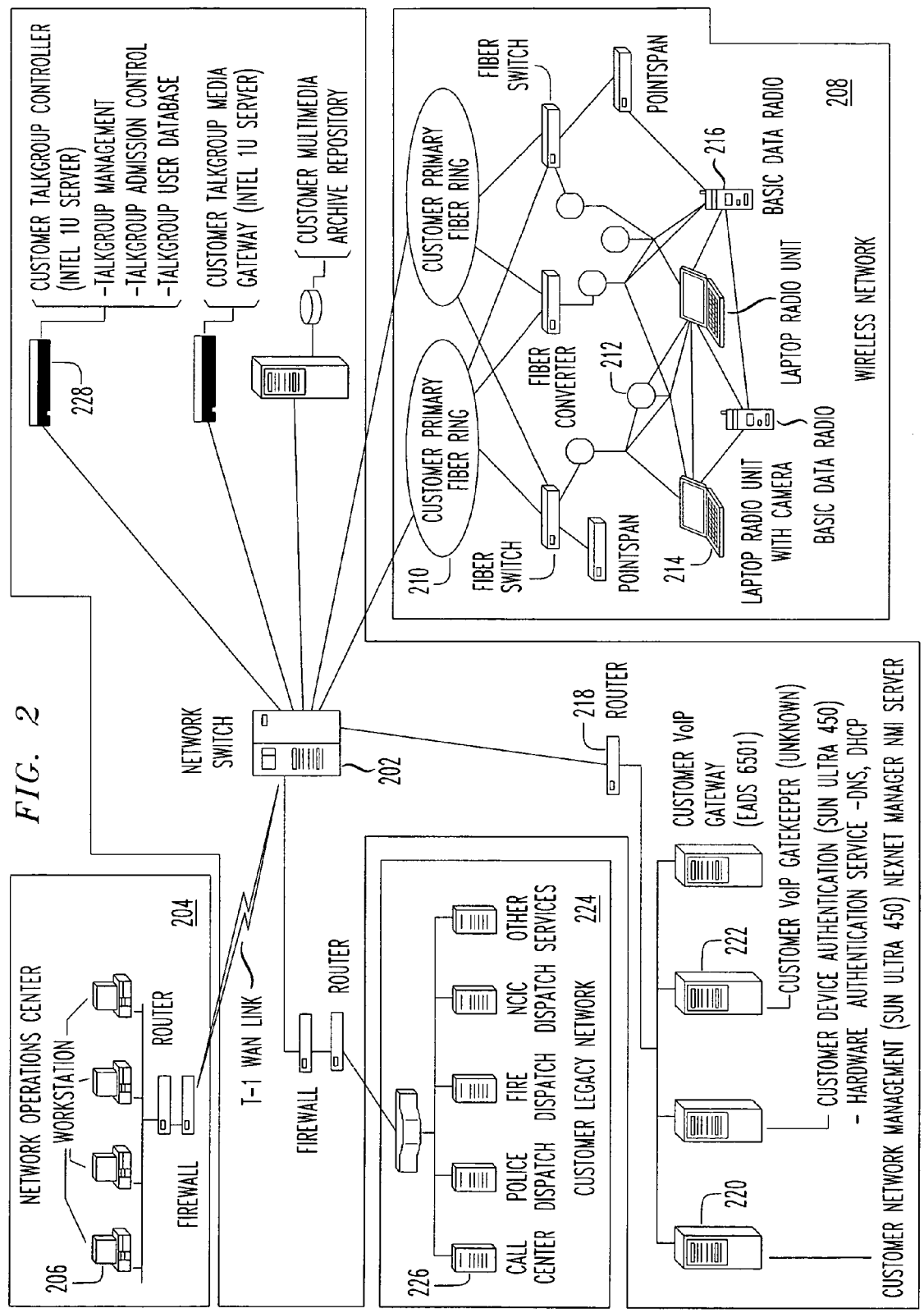
FIG. 2 illustrates a schematic diagram of one embodiment of a physical model corresponding to the public safety communications infrastructure conceptual diagram of FIG. 1 and constructed according to the principles of the present invention.
Figure 3:
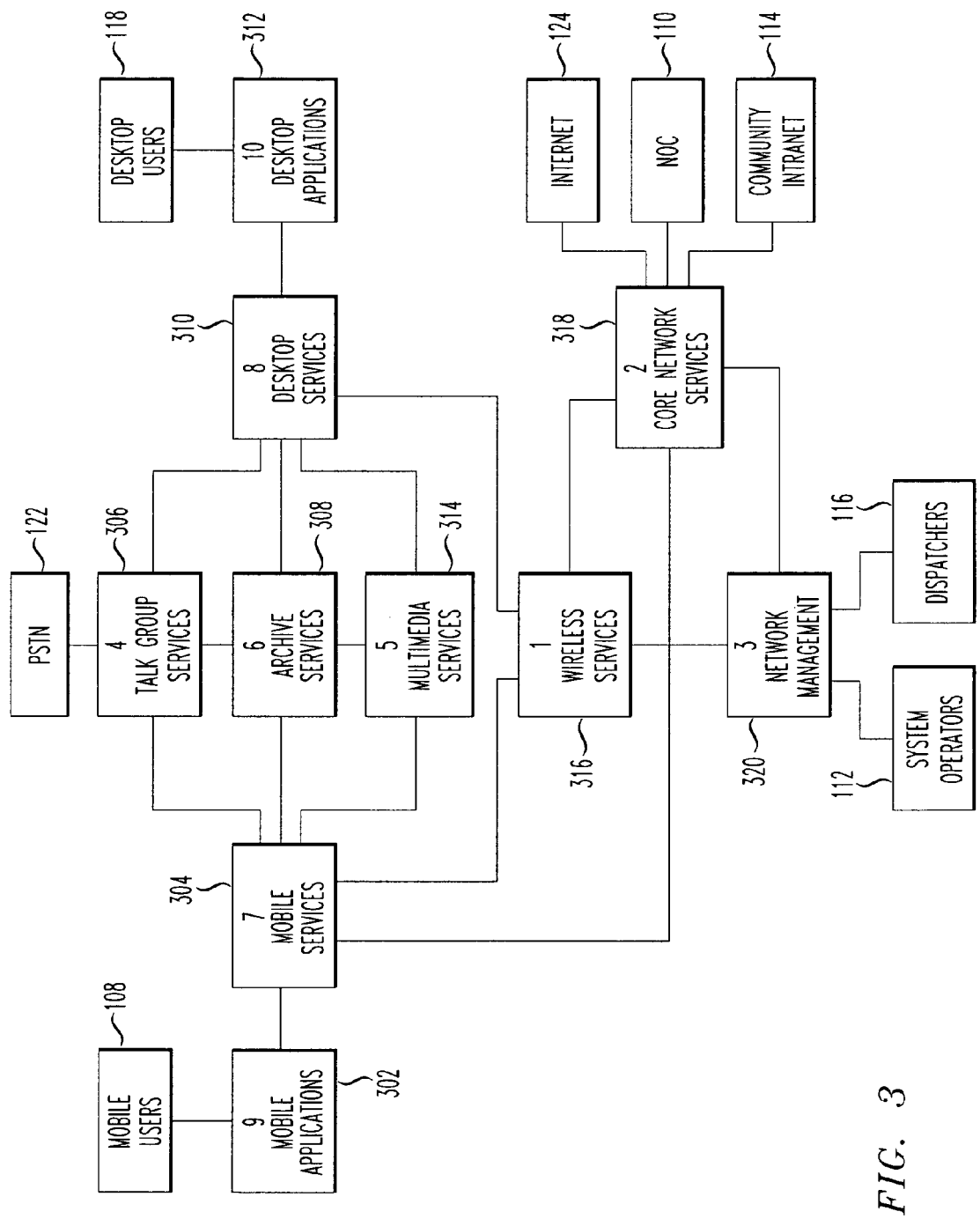
FIG. 3 illustrates a block diagram of one embodiment of a functional groups model corresponding to the public safety communications infrastructure conceptual diagram of FIG. 1 and constructed according to the principles of the present invention.

Having described an exemplary conceptual diagram, specific physical and logical aspect of the conceptual diagram can now be described. The illustrated embodiment of the infrastructure can be thought of as being composed of a number of physical and logical functional groups that integrate together to create the complete infrastructure. FIG. 2 illustrates exemplary physical groups, and FIG. 3 illustrates exemplary logical groups. The exemplary physical groups of FIG. 2 will first be described.

Accordingly, turning now to FIG. 2, illustrated is a schematic diagram of one embodiment of a physical model corresponding to the public safety communications infrastructure conceptual diagram of FIG. 1 and constructed according to the principles of the present invention.

At the center of the model is a community network switch 202. A NOC 204 is coupled to the switch via a T1 WAN link and one or more routers (shown but not referenced). A plurality of workstations are located in the NOC 204, one of which being referenced as workstation 206.

A wireless network 208 is also coupled to the switch 202. The wireless network 208 is illustrated as containing a community primary fiber ring 210 and a community secondary fiber ring (shown but not referenced).

Various fiber switches and converters (shown but not referenced) may be coupled to the fiber rings and allow various network resources, such as wireless elements (access gateways and wireless routers), to be coupled to the fiber rings. One of the illustrated fiber switches couples the community primary fiber ring 210 to a wireless element 212. The wireless element 212 takes the specific form of a pod that can be slung under a streetlight or traffic light or mounted on a building, for example.

The wireless elements (including the particular wireless element 212) allow various wireless devices to communicate with the wireless network 208. Laptop radio units, laptop computers and personal communication devices (e.g., basic data radios) are possible ones of such wireless devices. FIG. 2 illustrates several such devices, but specifically designates an exemplary laptop radio unit (with a camera) 214 and an exemplary basic data radio 216 by way of example.

A router 218 couples the switch 202 to various community network management resources and gateways. Several are shown in FIG. 2, including a community authentication device and a community VoIP gateway, but a community network manager is designated 220, and a community VoIP gatekeeper is designated 222 by way of example.

A community legacy network 224 is also illustrated as being coupled to the switch 202. The community legacy network 224 includes several dispatch resources and other services, but a 911 call center is designated 226 by way of example.

Finally, other community resources are shown in FIG. 2, including a community talkgroup controller 228, a community talkgroup media gateway (not referenced) and a community multimedia archive repository (not referenced) for storing such things as audio or video evidence.

Having described the exemplary physical groups of FIG. 2, the exemplary logical groups of FIG. 3 will now be described. Accordingly, turning now to FIG. 3, illustrated is a block diagram of one embodiment of a functional groups model corresponding to the public safety communications infrastructure conceptual diagram of FIG. 1 and constructed according to the principles of the present invention. FIG. 3 illustrates the mobile users 108, NOC 110, system operators 112, community intranet 114, dispatchers 116, desktop users 118, PSTN 122 and Internet 124 of FIG. 1.

A mobile applications functional group 302 may advantageously provide the hardware and software components for mobile applications for handheld radios. The mobile applications functional group 302 may advantageously one or more of the following functions.

Mobile talkgroup client—The illustrated embodiment of the present invention advantageously provides a talkgroup client application for the mobile radio to allow full support of the illustrated embodiment of the infrastructure talkgroups by the user.

Mobile VoIP client—The illustrated embodiment of the present invention advantageously provides a VoIP soft phone client application for the mobile radio to allow VoIP phone calls to and from the PSTN and IP addresses.

Mobile location client—The illustrated embodiment of the present invention advantageously provides a geolocation position display client for the mobile radio to allow textual and graphical representation of the mobile user's current physical position in the wireless network.

Configuration browser—The illustrated embodiment of the present invention advantageously provides a client application to allow browsing and editing the mobile radio configuration by the user.

Debug info browser—The illustrated embodiment of the present invention advantageously provides a client application to allow browsing of local debug and status information on the handheld radio.

Web browser—The illustrated embodiment of the present invention advantageously provides a client application to allow web browsing of HyperText Transfer Protocol (HTTP) servers from the mobile radio.

Text chat client—The illustrated embodiment of the present invention advantageously provides a client application to allow text chat on the mobile radio with other the illustrated embodiment of the infrastructure users.

The mobile services functional group 304 may advantageously provide the hardware and software components for mobile applications support for handheld radios. The mobile services functional group 304 may advantageously provide one or more of the following functions.

Basic data radio—The illustrated embodiment of the present invention advantageously employs a ruggedized handheld access device that supports wireless routing and protocols and is capable of handling VoIP communications.

Enhanced data radio—The illustrated embodiment of the present invention advantageously employs a handheld access device that supports wireless routing and protocols, capable of handling VoIP communications and may advantageously provide personal digital assistant (PDA)-like features and functions.

Hazardous materials ("hazmat") data radio—The illustrated embodiment of the present invention advantageously employs a ruggedized handheld access device that supports the illustrated embodiment of the infrastructure wireless routing and the illustrated embodiment of the infrastructure protocols, capable of handling VoIP communications and is designed for use by individuals using protective clothing and equipment with limited mobility and dexterity.

Dash mount data radio—The illustrated embodiment of the present invention advantageously employs a device that supports the illustrated embodiment of the infrastructure wireless routing and the illustrated embodiment of the infrastructure protocols, capable of handling VoIP communications and is suitable for dash-mount installation in an automobile.

Push-activated operation—The illustrated embodiment of the present invention advantageously provides a mechanism to allow push-button activation to send voice on a voice connection.

Emergency call button—The illustrated embodiment of the present invention advantageously provides an emergency call button on all user radio devices to send a notification to a management location.

Mobile status monitor—The illustrated embodiment of the present invention advantageously allows remote monitoring of user radio device status via unsolicited "heartbeat" messages to indicate the radio is currently in-network and operating normally.

Voice support—The illustrated embodiment of the present invention advantageously provides, for user radio devices with voice support, support for the G.711 and G.729a codecs. Of course, the present invention is not limited to such codecs.

Multimedia support—The illustrated embodiment of the present invention advantageously provides, for user radios with graphics support, multimedia and processing support as appropriate to the device peripherals.

Offline voice communications—The illustrated embodiment of the present invention advantageously provides, for user radios with voice support, a mechanism in all mobile radios to allow voice communications when currently not in the wireless network.

Geolocation handling—The illustrated embodiment of the present invention advantageously provides a mechanism to handle geolocation position reports received locally on the radio from the wireless interface device.

Operating system—The illustrated embodiment of the present invention advantageously employs the Linux operating system in the user radios. However, all existing or later-developed operating systems fall within the broad scope of the present invention.

Java—The illustrated embodiment of the present invention advantageously employs a Java run-time virtual machine in the user radios. However, this need not be the case.

Graphics layer—The illustrated embodiment of the present invention advantageously employs a graphics layer application programming interface (API) in all user radios with graphics support.

SNMP administration—The illustrated embodiment of the present invention advantageously employs in all user devices an SNMP management interface.

Web administration—The illustrated embodiment of the present invention advantageously employs user devices with an embedded web-based device administration interface using an HTTP server that supports the following browsers: Internet Explorer and Mozilla.

Console administration—The illustrated embodiment of the present invention advantageously employs user devices that provide console mode device administration interface using a 3-wire RS-232 interface with the following port settings: 115.2 Kbps, 8 data bits, no parity, 1 stop bit, no flow control.

Remote console administration—The illustrated embodiment of the present invention advantageously employs user devices that provide remote console mode device administration interface using the Secure Shell (SSH) protocol.

A talkgroup services functional group 306 may advantageously provide the hardware and software components for the talkgroups. In the illustrated embodiment, multiple users may be associated together to participate in a common voice communications session similar to existing LMR talkgroups. Additionally, talkgroups can integrate members from the wireless network, the wired network, PSTN callers and some legacy LMR systems. The talkgroup functional group 306 can advantageously provide one or more of the following functions.

Digital voice talkgroups—The illustrated embodiment of the present invention advantageously supports digital voice talkgroups for multiple simultaneous users.

Talkgroup administration—The illustrated embodiment of the present invention advantageously supports talkgroup administration.

Talkgroup routing—The illustrated embodiment of the present invention advantageously supports routing talkgroup communications to all members of the talkgroup.

Talkgroup admission control—The illustrated embodiment of the present invention advantageously controls admission to a talkgroup to prevent unauthorized access to talkgroups.

Talkgroup gateway—The illustrated embodiment of the present invention advantageously allows PSTN access to the talkgroups.

Talkgroup protocol—The illustrated embodiment of the present invention advantageously uses a UDP-based communication protocol to provide VoIP connectivity.

Number of talkgroups—The illustrated embodiment of the present invention advantageously supports a minimum of 65535 discrete talkgroups.

Hierarchical talkgroups—The illustrated embodiment of the present invention advantageously supports hierarchically organized talkgroups.

Number of talkgroup users—The illustrated embodiment of the present invention advantageously supports a minimum of 65535 discrete users to access the talkgroup system.

Number of users in a talkgroup—The illustrated embodiment of the present invention advantageously supports a minimum of 768 discrete users to access a single talkgroup in the talkgroup system.

Talkgroup latency—The illustrated embodiment of the present invention advantageously does not introduce voice latency to exceed 2 seconds to or from the voice router not accounting for network path delays.

Talkgroup recording—The illustrated embodiment of the present invention advantageously provides a mechanism to record talkgroup conversations for later retrieval and playback.

Talkgroup membership—The illustrated embodiment of the present invention advantageously provides a mechanism to allow talkgroup users to be associated as members of one or more talkgroups.

Talkgroup rights—The illustrated embodiment of the present invention advantageously provides a mechanism to assign and manage membership rights in talkgroups to include the following rights: Connect from PSTN, override talkers and listen only.

Talkgroup hierarchy—The illustrated embodiment of the present invention advantageously provides a mechanism to coordinate talkgroups in a hierarchical fashion with a maximum of 8 levels.

Create talkgroup—The illustrated embodiment of the present invention advantageously provides a mechanism to allow new talkgroups to be created.

Delete talkgroup—The illustrated embodiment of the present invention advantageously provides a mechanism to allow existing talkgroups to be deleted.

Edit talkgroup—The illustrated embodiment of the present invention advantageously provides a mechanism to allow the settings and parameters of existing talkgroups to be edited.

Suspend talkgroup—The illustrated embodiment of the present invention advantageously provides a mechanism to allow existing talkgroups to be suspended.

Reinstate talkgroup—The illustrated embodiment of the present invention advantageously provides a mechanism to allow suspended talkgroups to be reinstated.

Combine talkgroups—The illustrated embodiment of the present invention advantageously provides a mechanism to allow existing talkgroups to be combined into a super group.

Split talkgroups—The illustrated embodiment of the present invention advantageously provides a mechanism to allow existing talkgroups to be split into a multiple groups.

Prioritize talkgroups—The illustrated embodiment of the present invention advantageously provides a mechanism to allow existing talkgroups to be prioritized for determining quality of service (QoS) objectives.

Raise talkgroup—The illustrated embodiment of the present invention advantageously provides a mechanism to raise a talkgroup up a level in the talkgroup hierarchy.

Lower talkgroup—The illustrated embodiment of the present invention advantageously provides a mechanism to lower a talkgroup down a level in the talkgroup hierarchy.

Move talkgroup—The illustrated embodiment of the present invention advantageously provides a mechanism to move a talkgroup to an arbitrary level in the talkgroup hierarchy.

Create talkgroup user—The illustrated embodiment of the present invention advantageously provides a mechanism to allow new talkgroup users to be created.

Delete talkgroup user—The illustrated embodiment of the present invention advantageously provides a mechanism to allow existing talkgroup users to be deleted.

Edit talkgroup user—The illustrated embodiment of the present invention advantageously provides a mechanism to allow the settings and parameters of existing talkgroup users to be edited.

Suspend talkgroup user—The illustrated embodiment of the present invention advantageously provides a mechanism to allow existing talkgroup users to be suspended.

Reinstate talkgroup user—The illustrated embodiment of the present invention advantageously provides a mechanism to allow suspended talkgroup users to be reinstated.

Add talkgroup member—The illustrated embodiment of the present invention advantageously provides a mechanism to allow a talkgroup user to be added to a talkgroup.

Remove talkgroup member—The illustrated embodiment of the present invention advantageously provides a mechanism to allow a talkgroup user to be removed from a talkgroup.

Suspend talkgroup member—The illustrated embodiment of the present invention advantageously provides a mechanism to allow existing talkgroup members to be suspended.

Reinstate talkgroup member—The illustrated embodiment of the present invention advantageously provides a mechanism to allow suspended talkgroup members to be reinstated.

Migrate talkgroup member—The illustrated embodiment of the present invention advantageously provides a mechanism to allow talkgroup members to be migrated between talkgroups.

Copy talkgroup member—The illustrated embodiment of the present invention advantageously provides a mechanism to allow talkgroup members to be copied to multiple talkgroups (thus allowing membership in multiple simultaneous groups).

Talkgroup member rights—The illustrated embodiment of the present invention advantageously provides a mechanism to allow talkgroup members to be assigned talkgroup member rights.

An archive services functional group 308 may advantageously provide the hardware and software components for data archive features. The archive services functional group 308 may advantageously provide one or more of the following functions.

Talkgroup communications archive—The illustrated embodiment of the present invention advantageously provides a solution to archive all or selected talkgroup voice communications.

Multimedia communications archive—The illustrated embodiment of the present invention advantageously provides a solution to archive all or selected multimedia communications.

Geolocation position archive—The illustrated embodiment of the present invention advantageously provides a solution to archive all or selected geolocation position reports.

Archive content certification—The illustrated embodiment of the present invention advantageously provides a mechanism to certify the authenticity of all archive content.

Archive backup and restore—The illustrated embodiment of the present invention advantageously provides a solution to backup and restore all or selected parts of the archive content.

Archive reproduction—The illustrated embodiment of the present invention advantageously provides a solution to allow reproduction of archive content to offline media.

Browser access—The illustrated embodiment of the present invention advantageously provides a suitable user interface solution to allow authorized users to access multimedia content using an HTTP server that supports the following browsers: Internet Explorer and Mozilla. Of course, all browsers fall within the scope of the present invention.

Browser authentication—the illustrated embodiment of the infrastructure shall a mechanism to authenticate remote archive browsers.

A desktop services functional group 310 may advantageously provide the hardware and software components for the illustrated embodiment of the infrastructure desktop applications support. The desktop services functional group 310 may advantageously provide one or more of the following functions.

Voice support—The illustrated embodiment of the present invention advantageously provides user radio devices with voice support for the following codecs: G.711 and G.729a. Of course, all codecs fall within the broad scope of the present invention.

Multimedia support—The illustrated embodiment of the present invention advantageously provides multimedia and processing support for the following desktop platforms: Microsoft Windows 2000/XP and Red Hat Linux 9. Of course, all operating systems fall within the broad scope of the present invention.

Desktop status monitor—The illustrated embodiment of the present invention advantageously provides a solution to allow remote monitoring of the desktop connection status via unsolicited "heartbeat" messages to indicate the desktop unit is currently connected to the wireless network and operating normally.

Geolocation handling—The illustrated embodiment of the present invention advantageously provides a mechanism to handle geolocation position reports received locally on the desktop from a wireless interface card.

A desktop applications functional group 312 may advantageously provide the hardware and software components for public safety answering points (PSAP) desktop applications. The desktop applications functional group 312 may advantageously provide one or more of the following functions.

Talkgroup client—The illustrated embodiment of the present invention advantageously provides a talkgroup client application for Windows and Linux desktops to allow full support of talkgroups by the user.

VoIP client—The illustrated embodiment of the present invention advantageously provides a VoIP soft phone client application for Windows and Linux desktops to allow VoIP phone calls to and from PSTN and IP addresses.

Graphical information systems (GIS) client—The illustrated embodiment of the present invention advantageously provides a GIS position display application for Windows and Linux desktops to allow textual and graphical representation of the position of multiple configured wireless units.

Computer-aided dispatch (CAD) client—The illustrated embodiment of the present invention advantageously provides a CAD application for Windows and Linux desktops to allow PSAP dispatching operations with wireless units.

Alert client—The illustrated embodiment of the present invention advantageously provides an alert client application for Windows and Linux desktops to allow the display of "pushed" alert information and to create and "push" alert information to multiple destinations.

Web browser—The illustrated embodiment of the present invention advantageously provides a client application to allow Web browsing of WWW servers from Windows and Linux desktops.

Text chat client—The illustrated embodiment of the present invention advantageously provides a client application to allow text chat on Windows and Linux desktops with other the illustrated embodiment of the infrastructure users.

A multimedia services functional group 314 may advantageously provide the hardware and software for handling multimedia data, particularly video. The multimedia services functional group 314 may advantageously provide one or more of the following functions.

Mobile multimedia router—The illustrated embodiment of the present invention advantageously provides a wireless router to provide a buffered multimedia connection to the wired network that supports wireless network routing and protocols and is suitable for installation and operation in a vehicle.

Multimedia streaming cache—The illustrated embodiment of the present invention advantageously provides a mechanism to cache the multimedia streams in the mobile multimedia router to handle periods of limited or total loss of wireless bandwidth without loss of information on the stream.

Multimedia streaming cache capacity—The illustrated embodiment of the present invention advantageously provides a minimum of 10 gigabytes (GB) of persistent cache storage.

Operating system—The illustrated embodiment of the multimedia router advantageously uses the Linux operating system, but is not restricted to that operating system.

Java—The illustrated embodiment of the multimedia router uses a Java run-time environment, but is not restricted to that environment.

SNMP administration—The illustrated embodiment of the multimedia router advantageously provides an SNMP management interface that supports SNMP v1 as a minimum, with support for SNMP v3 where possible.

Web administration—The illustrated embodiment of the present invention advantageously provides an embedded Web-based device administration interface using an HTTP server that supports the following browsers: Internet Explorer and Mozilla. Of course, other operating systems fall within the broad scope of the present invention.

Console administration—The illustrated embodiment of the present invention advantageously provides a console mode device administration interface using a 3-wire RS-232 interface with the following port settings: 115.2 Kbps, 8 data bits, no parity, 1 stop bit and no flow control.

Remote console administration—The illustrated embodiment of the present invention advantageously provides a remote console mode device administration interface using the SSH protocol.

Device administration functions—the mobile multimedia router administration user interfaces, regardless of their presentation, advantageously provide user access to the following device functions: reset the device, restore factory defaults, upgrade firmware, display wireless routing tables, display device status, disconnect from the wireless network, connect to the wireless network, view configuration parameters, edit configuration parameters, select multimedia content for transfer, transfer multimedia content to network host, transfer multimedia content to device, synchronize multimedia content with archive, delete selected multimedia content, delete all multimedia content, select multimedia content for local viewing and annotate multimedia content.

Remote access—The illustrated embodiment of the present invention advantageously allows the mobile multimedia router user interfaces to be remotely accessible from network-attached workstations.

User authentication—The illustrated embodiment of the present invention advantageously requires the mobile multimedia router user interfaces to be authenticated to allow access, though this need not be the case.

Multimedia stream routing—The illustrated embodiment of the present invention advantageously provides a solution to support routing and distribution of multimedia streams from any source to multiple simultaneous destinations based on user request.

Browser access—The illustrated embodiment of the present invention advantageously provides a suitable user interface solution to allow authorized users the ability to view multimedia content using an HTTP server that supports the following browsers: Internet Explorer and Mozilla. Of course, other browsers fall within the broad scope of the present invention.

User authentication—The illustrated embodiment of the present invention advantageously provides a solution to support user authentication for access to the multimedia streams.

Multimedia streaming formats—The illustrated embodiment of the present invention advantageously provides support for multimedia streaming formats.

Multimedia file formats—The illustrated embodiment of the present invention advantageously provides support for the multiple multimedia file formats.

A wireless services functional group 316 contains the hardware and software components for the wireless network infrastructure and subscriber access devices. The wireless services functional group 316 may advantageously provide one or more of the following functions.

Ruggedized wireless router—The illustrated embodiment of the present invention advantageously provides a wireless router device to extend wireless coverage that supports wireless network routing and protocols and is suitable for installation and operation in outdoor environments.

Ruggedized access point router—The illustrated embodiment of the present invention advantageously provides a wireless access point router device to provide an Ethernet connection to the wired network that supports wireless network routing and protocols and is suitable for installation and operation in outdoor environments.

Office wireless router—The illustrated embodiment of the present invention advantageously provides a wireless router device to extend wireless coverage that supports wireless network routing and protocols and is suitable for installation and operation in typical indoor environments.

Office access point router—The illustrated embodiment of the present invention advantageously provides a wireless access point router device to provide an Ethernet connection to the wired network that supports wireless network routing and protocols and is suitable for installation and operation in typical indoor environments.

Mini router—The illustrated embodiment of the present invention advantageously provides a low-cost, mini-router device to support wireless network routing and protocols that is self-powered, can be easily deployed and is suitable for operation in outdoor environments.

Primary power—The illustrated embodiment of the present invention advantageously provides wireless network infrastructure devices that are capable of being powered by 110 to 122 volts AC, auto-ranging 47 to 63 Hertz, single phase.

Alternative power source—The illustrated embodiment of the present invention advantageously provides wireless network infrastructure devices that have an alternative power input capable of supporting 3 Amperes at 12 volts DC.

Backup power source—The illustrated embodiment of the present invention advantageously provides wireless network infrastructure devices that have a backup power source to support operation during periods of primary outage for up to four hours per 48-hour period.

Power source change notification—The illustrated embodiment of the present invention advantageously provides wireless network infrastructure devices that provide a primary power change notification via SNMP to the infrastructure network management system when switching between power sources (primary to backup and backup to primary).

Operating system—The illustrated embodiment of the present invention advantageously provides that wireless infrastructure devices incorporating a host device or single-board computer (SBC) use the Linux operating system. Of course, other operating systems fall within the broad scope of the present invention.

Java—The illustrated embodiment of the present invention advantageously provides that wireless infrastructure devices incorporating a host device or SBC shall provide a Java runtime environment. Of course, other environments fall within the broad scope of the present invention.

Personal Computer Miniature Communications Interface Adapter (PCMCIA) network router (PNR)—The illustrated embodiment of the present invention advantageously provides a wireless adapter solution in a PCMCIA card to facilitate connection of host computers to the wireless network.

Universal Serial Bus (USB) network router (UNR)—The illustrated embodiment of the present invention advantageously provides a wireless adapter solution with a USB interface to facilitate connection of host computers to the wireless network.

PNR device driver for Windows—The illustrated embodiment of the present invention advantageously provides a device driver for the Windows 2000 and XP operating systems for the PNR.

PNR device driver for Linux—The illustrated embodiment of the present invention advantageously also provides a device driver for the Red Hat Linux operating system for the PNR. Of course, all operating systems fall within the broad scope of the present invention.

UNR device driver for Windows—The illustrated embodiment of the present invention advantageously provides a device driver for the Windows 2000 and XP operating systems for the UNR.

UNR device driver for Linux—The illustrated embodiment of the present invention advantageously also provides a device driver for the Red Hat Linux operating system for the UNR. Of course, all operating systems fall within the broad scope of the present invention.

SNMP administration—The illustrated embodiment of the present invention advantageously provides an SNMP management interface that supports SNMP v1 as a minimum with support for SNMP v3 where possible.

Web administration—The illustrated embodiment of the present invention advantageously provides, for wireless infrastructure devices that incorporate a host device or SBC, an embedded web-based device administration interface using an HTTP server that supports the following browsers: Internet Explorer and Mozilla.

Console administration—The illustrated embodiment of the present invention advantageously provides, for wireless infrastructure devices that incorporate a host device or SBC, console mode device administration interface using a 3-wire RS-232 interface with the following port settings: 115.2 Kbps, 8 data bits, no parity, 1 stop bit and no flow control.

Remote console administration—The illustrated embodiment of the present invention advantageously provides, for wireless infrastructure devices that incorporate a host device or SBC, remote console mode device administration interface using the SSH protocol.

Device administration functions—The illustrated embodiment of the present invention advantageously provides device administration user interfaces, regardless of their presentation that allow user access to the following device functions: reset the device, restore factory defaults, upgrade firmware, display wireless routing tables, display device status, view configuration parameters and edit configuration parameters.

Network security—The illustrated embodiment of the present invention advantageously provides, for wireless devices that incorporate a host device or SBC, network security options in the host operating system as appropriate, specifically disabling the Telnet, File Transfer Protocol (FTP) and Trivial FTP (TFTP) (server) protocols.

Wireless link encryption—The illustrated embodiment of the present invention advantageously provides encryption on the wireless link protocol for all control and data frames carried on the wireless network. The present invention encompasses all conventional and later-developed forms of encryption.

Wireless link multi-level QoS—The illustrated embodiment of the present invention advantageously provides a multi-level quality of service (QoS) solution on the wireless link protocol for all control and data frames carried on the wireless network. The present invention encompasses all conventional and later-developed QoS mechanisms.

A core network services functional group 318 may advantageously provide the hardware and software components for the core wired network infrastructure and routing/switching fabric. The core network services functional group 318 may advantageously provide one or more of the following functions.

Internet access—The illustrated embodiment of the present invention advantageously provides a routed interface to an Internet service provider for connecting to the Internet.

Intranet access—The illustrated embodiment of the present invention advantageously provides a routed interface to a community intranet.

Core switching and routing—The illustrated embodiment of the present invention advantageously provides network switches and routers for connectivity.

Network firewall—The illustrated embodiment of the present invention advantageously provides a network firewall to protect the Internet and intranet connections.

Dynamic Host Configuration Protocol (DHCP)—The illustrated embodiment of the present invention advantageously provides a DHCP service for dynamic configuration of attached equipment.

Domain name Service (DNS)—The illustrated embodiment of the present invention advantageously provides DNS for dynamic configuration of attached equipment.

User level authentication—The illustrated embodiment of the present invention advantageously provides a user level authentication mechanism to validate user access to the infrastructure services with user login credentials.

PSTN gateway—The illustrated embodiment of the present invention advantageously provides a gateway/gatekeeper for voice calls to and from the PSTN.

Traffic shaping—The illustrated embodiment of the present invention advantageously provides a suitable traffic shaping solution to control the bandwidth utilization of the core network and external connections by individual subscribers.

Web caching—The illustrated embodiment of the present invention advantageously provides a suitable web caching solution to improve system performance when accessing web pages.

Intrusion monitor—The illustrated embodiment of the present invention advantageously provides a suitable network intrusion monitor solution to detect when unauthorized users have accessed the illustrated embodiment of the infrastructure.

Logging services—The illustrated embodiment of the present invention advantageously provides a system logging solution to allow infrastructure devices to log system actions and events and application actions and events to a common logging service using a SysLog format and interface.

Logging user interface—The illustrated embodiment of the present invention advantageously provides a suitable user interface solution to allow authorized users the ability to view and maintain the system logs using an HTTP server that supports the following browsers: Internet Explorer and Mozilla. Of course, other browsers fall within the broad scope of the present invention.

Logging administrative functions—The illustrated embodiment of the present invention advantageously provides a logging user interface that provides access to the following logging admin functions: select logs for display by type and date, view a log, filter log displays by field, force log rollover to new log file, view logging configuration parameters, modify logging configuration parameters and back up system logs.

Wireless device authorization—The illustrated embodiment of the present invention advantageously provides a hardware authentication service for authenticating wireless devices onto the infrastructure.

Position routing—The illustrated embodiment of the present invention advantageously provides a mechanism to route geolocation position reports from individual devices to multiple configurable destinations.

SNMP managed—The illustrated embodiment of the present invention advantageously provides that all network equipment advantageously be SNMP manageable.

Console device administration—The illustrated embodiment of the present invention advantageously provides that all network equipment provide console mode device administration interface using an RS-232 interface. Of course, other interfaces fall within the broad scope of the present invention.

Remote device administration—The illustrated embodiment of the present invention advantageously provides that all network equipment provide a remote console mode device administration interface using a TCP/IP connection.

Device security—The illustrated embodiment of the present invention advantageously provides that all network equipment provide a means to deny administrative access to unauthorized users attempting to use any of the device administration interfaces.

A network management functional group 320 may advantageously provide the hardware and software components for complete network management of a NOC. The network management functional group 320 may advantageously provide one or more of the following functions.

Network management system—The illustrated embodiment of the present invention advantageously provides a network management solution that incorporates the wireless management system and management of core network and other infrastructure elements.

Alarms and alerts—The illustrated embodiment of the present invention advantageously provides a system for alarm and alert handling for system operators.

Trouble ticket system—The illustrated embodiment of the present invention advantageously provides a trouble ticket solution for managing issues at the NOC.

Facilities monitor—The illustrated embodiment of the present invention advantageously provides a solution for monitoring the physical components of the NOC and reporting events to the network management system.

Wireless element management system—The illustrated embodiment of the present invention advantageously provides a wireless element management system for the wireless infrastructure and subscriber devices.

North bound interface—The illustrated embodiment of the present invention advantageously provides a north bound interface to an encompassing network management system.

Wireless subscriber provisioning—The illustrated embodiment of the present invention advantageously provides a mechanism to handle provisioning wireless subscribers for access to the wireless network.

Over-the-air updates—The illustrated embodiment of the present invention advantageously provides a mechanism to facilitate over-the-air updates of configuration parameters and firmware for to wireless devices.

Wireless Media Access Controller (MAC) lookup—The illustrated embodiment of the present invention advantageously provides a mechanism to allow the lookup of a wireless device by its MAC address to provide the IP address currently in use by the device.

Wireless IP lookup—The illustrated embodiment of the present invention advantageously provides a mechanism to allow the lookup of a wireless device by its IP address to provide the MAC address of the device.

Wireless subscriber access rights—The illustrated embodiment of the present invention advantageously provides a mechanism to remotely control wireless subscriber access rights to the wireless network.

Wireless subscriber usage audit—The illustrated embodiment of the present invention advantageously provides a mechanism to audit system usage by wireless subscribers.

Operator authentication—The illustrated embodiment of the present invention advantageously provides a solution for authenticating system operators for access to the network management system.

Network firewall—The illustrated embodiment of the present invention advantageously provides a network firewall to protect the network management system from unauthorized access.

The following requirements identify network management user interfaces.

Wireless device provisioning—The illustrated embodiment of the present invention advantageously provides a wireless device provisioning user interface.

Wireless device management—The illustrated embodiment of the present invention advantageously provides a wireless device management user interface.

Wireless network status—The illustrated embodiment of the present invention advantageously provides a wireless network status user interface.

Wireless network performance—The illustrated embodiment of the present invention advantageously provides a wireless network performance user interface.

Network alarms and alerts—The illustrated embodiment of the present invention advantageously provides a network alarms and alerts user interface.

Operator access rights management—The illustrated embodiment of the present invention advantageously provides an operator access and rights management user interface.

Trouble ticket management—The illustrated embodiment of the present invention advantageously provides a trouble ticket management user interface.

User audit management and reporting—The illustrated embodiment of the present invention advantageously provides a user audit management and reporting user interface.

DNS configuration and maintenance—The illustrated embodiment of the present invention advantageously provides a DNS configuration and maintenance user interface.

DHCP configuration and maintenance—The illustrated embodiment of the present invention advantageously provides a DHCP configuration and maintenance user interface.

Remote access—The illustrated embodiment of the present invention advantageously provides that network management user interfaces be remotely accessible from network-attached workstations.

Operator authentication—The illustrated embodiment of the present invention advantageously provides that network management user interfaces require system operators to be authenticated to allow access.

The system interoperability functional group (not shown) may advantageously provide the hardware and software components for infrastructure interoperability and roaming users. The system interoperability functional group may advantageously provide one or more of the following functions.

Inter-system roaming—The illustrated embodiment of the present invention advantageously provides a mechanism to allow wireless subscriber roaming between cooperative wireless systems.

Roaming subscriber authentication—The illustrated embodiment of the present invention advantageously provides a mechanism, similar to a visitor location register (VLR), to handle roaming subscriber authentication in the wireless system.

RF co-existence—The illustrated embodiment of the present invention advantageously provides a mechanism to allow neighboring wireless systems to co-exist without causing significant RF interference issues.

Policy coordination—The illustrated embodiment of the present invention advantageously provides a mechanism to allow cooperative municipalities to coordinate roaming and wireless subscriber policies.

The specific embodiment of the infrastructure set forth in FIG. 3 further has some non-functional requirements. These non-functional requirements include one or more of the following.

Ruggedized hardware—The illustrated embodiment of the present invention advantageously provides appropriate levels of ruggedness and environmental protection for all hardware products.

FCC certification—The illustrated embodiment of the present invention advantageously provides FCC certification of hardware products as appropriate.

No single point of failure—The illustrated embodiment of the present invention advantageously avoids single points of failure.

Fault tolerance and avoidance—The illustrated embodiment of the present invention advantageously provides fault tolerance and avoidance.

As illustrated in FIG. 3, the functional groups 302, 304, 306, 308, 310, 312, 314, 316, 318, 320 can be integrated to create a given infrastructure. Having described the functional groups 302, 304, 306, 308, 310, 312, 314, 316, 318, 320 separately, the internal interfaces among the functional groups 302, 304, 306, 308, 310, 312, 314, 316, 318, 320 will now be identified and described.

A wireless services-core network services interface (not shown, but coupling the wireless services functional group 316 and the core network services functional group 318) operates over the backhaul 106. This interface is a composite of the typical IP routing, service and application protocols that allow wireless devices to communicate on the illustrated embodiment of the infrastructure.

A wireless services-network management interface (not shown, but coupling the wireless services functional group 316 and the network management functional group 320) operates over the NOC interface. This interface is implemented with SNMP and other management protocols to facilitate management of the wireless network.

A wireless services-mobile services interface (not shown, but coupling the wireless services functional group 316 and the mobile services functional group 304) operates through a wireless network adapter using wireless protocols. This interface primarily consists of a device driver and network stack on the device.

A wireless services-desktop services interface (not shown, but coupling the wireless services functional group 316 and the desktop services functional group 310) operates through a wireless network adapter using wireless protocols. This interface primarily consists of a device driver and network stack on the device.

A core network services-network management services interface (not shown, but coupling the core network services functional group 318 and the network management services functional group 320) operates over the NOC interface. This interface is implemented with SNMP and other management protocols to facilitate management of the wired network.

A talkgroup services-mobile services interface (not shown, but coupling the talkgroup services functional group 306 and the mobile services functional group 304) is provided by APIs and libraries on the appropriate host platforms to allow mobile services talkgroup client applications to be created to use talkgroup communications protocols allowing mobile users to participate in talkgroups.

A talkgroup services-desktop services interface (not shown, but coupling the talkgroup services functional group 306 and the desktop services functional group 310) is provided by APIs and libraries on the appropriate host platforms to allow desktop services talkgroup client applications to be created to use talkgroup communications protocols allowing mobile users to participate in talkgroups.

A talkgroup services-archive services interface (not shown, but coupling the talkgroup services functional group 306 and the archive services functional group 308) may advantageously provide the mechanism to allow talkgroup communications to be recorded by archive services.

A multimedia services-mobile services interface (not shown, but coupling the multimedia services functional group 314 and the mobile services functional group 304) is provided by APIs and libraries on the appropriate host platforms to allow mobile services multimedia client applications to be created to use multimedia streaming and other protocols allowing mobile users to transmit and receive multimedia content over the network.

A multimedia services-desktop services interface (not shown, but coupling the multimedia services functional group 314 and the desktop services functional group 310) is provided by APIs and libraries on the appropriate host platforms to allow desktop services multimedia client applications to be created to use multimedia streaming and other protocols allowing mobile users to transmit and receive multimedia content over the network.

A multimedia services-archive services interface (not shown, but coupling the multimedia services functional group 314 and the archive services functional group 308) may advantageously provide the mechanism to allow multimedia communications to be recorded by archive services. This interface is provided by a network connection to archive services over the network.

An archive services-mobile services interface (not shown, but coupling the archive services functional group 308 and the mobile services functional group 304) is provided by APIs and libraries on the appropriate host platforms to allow mobile services client applications to be created to use archive services and view archive content remotely through the network.

An archive services-desktop services interface (not shown, but coupling the archive services functional group 308 and the desktop services functional group 310) is provided by APIs and libraries on the appropriate host platforms to allow desktop services client applications to be created to use archive services and view archive content remotely through the network.

A mobile services-mobile applications interface (not shown, but coupling the mobile services functional group 304 and the mobile applications functional group 302) is provided by APIs and libraries on the appropriate host platforms to allow mobile applications to be created to use mobile services to access the network and connected systems.

A desktop services-desktop applications interface (not shown, but coupling the desktop services functional group 310 and the desktop applications functional group 312) is provided by APIs and libraries on the appropriate host platforms to allow mobile applications to be created to use desktop services to access the network and connected systems.

The following highlight summaries of use cases that have been considered for the illustrated embodiment of the infrastructure at this time. The use cases are presented here in loose categories for convenience.

Numerous user types have been identified for the illustrated embodiment of the infrastructure when each specific job function of the target user audience is considered. However, the number can be reduced down to just a few unique user types, when considering how they would interact with the illustrated embodiment of the infrastructure. These unique user types will now be described and become the "actors" referenced in the use cases.

Mobile users are any system users, of any job function, who gain access to system or Internet resources from a mobile device on the wireless network, regardless of device type.

Desktop users are any system users, of any of job function, who gain access to system or Internet resources from a device on the wired network, regardless of device type.

System operators are super-users who have the authorization and resources to administer and maintain the illustrated embodiment of the infrastructure. System operators are a superset of desktop users and share many characteristics.

Dispatchers are super-users who have the authorization and resources to resource dispatching and limited management of the illustrated embodiment of the infrastructure. Dispatchers are a superset of desktop users and share many characteristics. Dispatchers also share much in common with system operators.

Network users are any users who are on a system or device that is reachable via the network. The network users may be directly attached to the infrastructure or reached through an off-network route.

Technical support personnel are all system maintainers who report directly to the overall system management structure, regardless of the particular community site they may serve.

Technical support personnel are all system maintainers that report directly to the client system management structure for a particular community site.

The client applications use cases deal with activities that affect applications that would reside on the client's devices that are connected to the infrastructure.

Broadcast amber alert to a laptop radio unit—A dispatcher broadcasts amber alert to a mobile user with a laptop radio unit.

Broadcast an "all-points bulletin" (APB) to a laptop radio unit—A dispatcher broadcasts an APB to a mobile user with a laptop radio unit.

Broadcast a "be on the lookout" (BOLO) alert to a laptop radio unit—A dispatcher broadcasts a BOLO alert to a mobile user with a laptop radio unit.

Broadcast weather alert to a laptop radio unit—A dispatcher enters a weather alert applicable to a particular county or city to be broadcast to a mobile user with a laptop radio unit.

Browse web from a laptop radio unit—A mobile user with a laptop radio unit browses the Internet from a laptop radio unit.

Perform text chat on a laptop radio unit—A mobile user with a laptop radio unit uses text chat to communicate with network users.

Broadcast amber alert to a basic data radio—A dispatcher broadcasts an amber alert to a mobile user with a basic data radio unit.

Broadcast an APB to a basic data radio—A dispatcher broadcasts an APB to a mobile user with a basic data radio.

Broadcast a BOLO alert to a basic data radio—A dispatcher broadcasts a BOLO alert to a mobile user with a basic data radio.

Broadcast weather alert to basic data radio—A dispatcher enters a weather alert applicable to a particular county or city to be broadcast to a mobile user with a basic data radio.

Monitoring of a laptop radio unit—A dispatcher monitors the status of a laptop radio unit in the network. Typical monitoring may involve a health status check (heartbeat), check of the signal strengths (transmit/receive), geolocation information, etc.

Monitoring of a pole-mounted element (e.g., access gateway/wireless router)—A dispatcher monitors the status of a pole-mounted router in the network. Typical monitoring may involve a health status check (heartbeat), check of the signal strengths (transmit/receive), geolocation information, etc.

Monitoring of an access point router—A dispatcher monitors the status of an access point router in the network. Typical monitoring may involve a health status check (heartbeat), check of the signal strengths (transmit/receive), geolocation information, etc.

Technical support monitoring of a laptop radio unit—Technical support personnel monitors the status of a laptop radio unit placed in the network. Typical monitoring may involve a health status check (heartbeat), check of the signal strengths (transmit/receive), geolocation information etc.

Technical support monitoring—Technical support personnel monitor the status of a pole mounted router in the network. Typical monitoring may involve a health status check (heartbeat), check of the signal strengths (transmit/receive), geolocation information etc.

Technical support monitoring of an access point router—Technical support personnel monitors the status of an access point router in the network. Typical monitoring may involve a health status check (heartbeat), check of the signal strengths (transmit/receive), geolocation information etc.

System operator monitoring of a laptop radio unit—System operator personnel monitors the status of a laptop radio unit placed in the network. Typical monitoring may involve a health status check (heartbeat), check of the signal strengths (transmit/receive), geolocation information, etc.

System operator monitoring of a pole-mounted element (e.g., access gateway/wireless router)—A system operator monitors the status of a pole-mounted element in the network. Typical monitoring may involve a health status check (heartbeat), check of the signal strengths (transmit/receive), geolocation information, etc.

System operator monitoring of an access point router—A system operator monitors the status of an access point router in the network. Typical monitoring may involve a health status check (heartbeat), check of the signal strengths (transmit/receive), geolocation information, etc.

Monitoring of a basic data radio—A dispatcher monitors the status of basic data radio placed in the network. Typical monitoring may involve a health status check (heartbeat), check of the signal strengths (transmit/receive), geolocation information, etc.

System operator monitoring of a basic data radio—A system operator monitors the status of a basic data radio placed in the network. Typical monitoring may involve a health status check (heartbeat), check of the signal strengths (transmit/receive), geolocation information, etc.

Technical support monitoring of a basic data radio—Technical support personnel monitors the status of a basic data radio placed in the network. Typical monitoring may involve a health status check (heartbeat), check of the signal strengths (transmit/receive), geolocation information, etc.

Network provisioning use cases deal with activities that involve provisioning devices on the illustrated embodiment of the infrastructure.

Provisioning a laptop radio unit—Technical support personnel provision (add, modify, delete) a laptop radio unit in the infrastructure.

Provisioning a pole-mounted element (e.g., access gateway/wireless router)—the illustrated embodiment of the infrastructure technical support personnel provision (add, modify, delete) a pole-mounted element in the infrastructure.

Provisioning an access point router—Technical support personnel provision (add, modify, delete) an access point router in the infrastructure.

Provisioning a basic data radio—Technical support personnel provision (add, modify, delete) a basic data radio in the infrastructure.

Network technical support use cases deal with activities that involve technical support handling in the illustrated embodiment of the infrastructure.

Problem reporting technical support to client—A user reports an issue to client technical support.

Problem reporting technical support to the illustrated embodiment of the infrastructure—A technical support issue escalates from a lower level to a higher level.

Basic VoIP use cases deal with activities that involve VoIP communications in the illustrated embodiment of the infrastructure.

Speak to a PSTN using a basic data radio—A mobile user initiates a VoIP phone call to the PSTN from a basic data radio.

Speak to a PSTN using a laptop radio unit—A mobile user initiates a VoIP phone call to the PSTN from a laptop radio unit.

Speak to a radio using a basic data radio—A mobile user initiates a VoIP phone call to another mobile user from a basic data radio.

Speak to a radio using a laptop radio unit—A mobile user initiates a VoIP phone call to another mobile user from a laptop radio unit.

The VoIP talkgroups use cases deal with activities that involve voice talkgroup communications in the illustrated embodiment of the infrastructure.

Create/edit/delete a talkgroup—A dispatcher creates/edits/deletes a talkgroup.

Create/edit/delete a talkgroup participant—A dispatcher creates/edits/deletes a talkgroup participant Add a new participant to a talkgroup—A dispatcher adds a previously created participant to a specific talkgroup previously created.

Remove a participant from a talkgroup—A dispatcher removes a participant from a specific talkgroup.

Join a talkgroup—A first responder (previously authorized to join a talkgroup) joins a talkgroup.

Speak to a talkgroup using a basic data radio—A mobile user speaks to a talkgroup using his/her basic data radio. The pre-condition is that the mobile user has joined the talkgroup (per the previous use case).

Speak to a talkgroup using a laptop radio unit—A mobile user speaks to a talkgroup using his/her laptop radio unit. The pre-condition is that the mobile user has joined the talkgroup (per the previous use case).

Leave a talkgroup—A mobile user leaves an associated talkgroup.

Having described in detail various aspects of the overall infrastructure, attention will now be turned to the access gateway and wireless router pods briefly introduced above.

The illustrated embodiment of the infrastructure owes its survivability in part to the fact that it is geographically distributed, much as is the Internet. Of course, some resources (servers, NOCs, call centers and the like are centralized, but the infrastructure takes advantage of a geographically distributed "mesh" of access gateways and wireless routers to reach out to mobile users. In the illustrated embodiment of the present invention, these access gateways and wireless routers cooperate to form an ad hoc or mesh network as described above. Thus, they are capable of interconnecting with one another based on current conditions or location and do not require logical configuration ahead of time.

Since they are widely distributed, predominantly located outdoors and cover a relatively small area (perhaps less than a mile in radius), it is highly desirable that the access gateways and wireless routers be rugged, straightforward to mount on conventional community or private fixtures, out of the way and easily and reliably powered.

Accordingly, the present invention introduces, among other things, an access gateway and wireless router pod. The pod is designed to be slung under a streetlight or traffic light or mounted on a building or a bridge or any fixture for that matter. The pod is also designed to tap into an existing power source but to have its own battery backup in case that existing power source is interrupted.

At this point, it should be noted that the pod may contain either an access gateway, a wireless router or both. Alternative embodiments of the pod may include still other modules or perform other functions without departing from the broad scope of the present invention.

Figure 4:
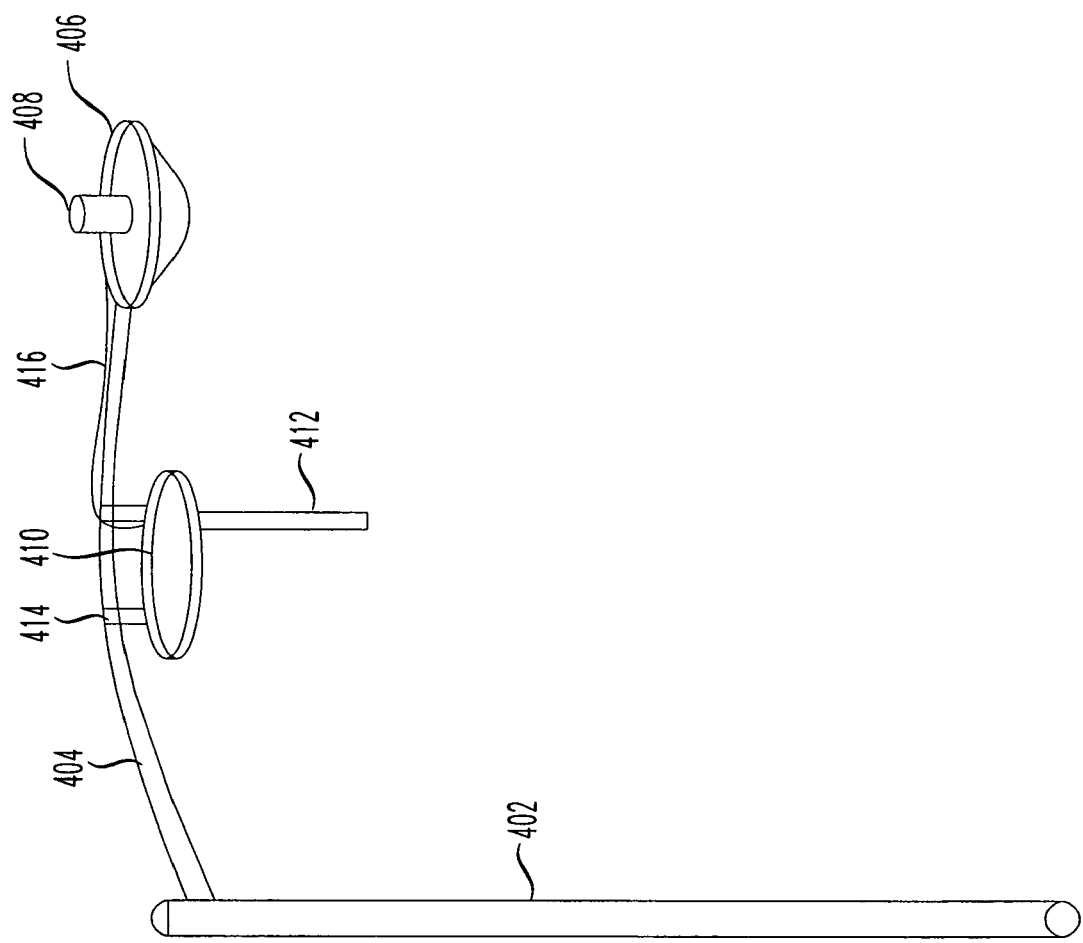
FIG. 4 illustrates an isometric view of one embodiment of an access gateway and wireless router pod constructed according to the principles of the present invention and slung under a streetlight.

Turning now to FIG. 4, illustrated is an isometric view of one embodiment of an access gateway and wireless router pod constructed according to the principles of the present invention and slung under a streetlight.

FIG. 4 shows a common streetlight, including a vertical pole 402, a cross-member 404, a lamphead 406 and a sensor 408. Electric power is provided to the lamphead 406 via a cable located within the vertical pole 402 and the cross-member 404. The sensor 408 senses daylight and controls the streetlight such that it is on only when it is relatively dark outside.

Communities around the world have streetlights of this type or variants thereof. The present invention takes advantage of this ubiquity.

A pod, containing either or both of an access gateway or a wireless router, is slung beneath the cross-member 404 of the streetlight and includes a weather-resistant housing 410. The specific embodiment of the weather-resistant housing 410 illustrated in FIG. 4 takes the form of a dielectric clamshell. Those skilled in the art will understand, however, that many other shapes and physical properties for the weather-resistant housing 410 fall within the broad scope of the present invention.

The pod further has an antenna 412 projecting downward from the weather-resistant housing 410 as illustrated. Those skilled in the art will understand, however, that the position, orientation and dimensions of the antenna may vary without departing from the broad scope of the present invention.

The weather-resistant housing 410 is slung beneath the cross-member 404 by means of a first type of mounting bracket 414. The first type of mounting bracket 414 involve a pair of bracket portions attached to distal portions of the weather-resistant housing 410 and that hook over or wrap around the cross-member 404 to secure the pod to the cross-member 404, even in harsh weather.

It is apparent from FIG. 4 that the first type of mounting bracket 414 are appropriate when the pod is to be mounted to a generally horizontal cross-member that is to extend over the pod. Other structures may require other types of mounting bracket. The present invention is by no means limited to a particular type or configuration of mounting bracket.

Finally, since the pod is to receive electric power and may be coupled to the wired network by means of a network cable or fiber, electrical connections are required. In FIG. 4, an electrical harness 416 extends from the weather-resistant housing 410 to the sensor 408, which in this case serves as a tap for electric power. In practice, the harness is provided with an interface (not referenced) that is designed to interpose the lamphead 406 and the sensor 408 and tap the needed electric power. Although FIG. 4 does not show it, a network cable or fiber may run from the weather-resistant housing 410, into or onto the cross-member 404 and into or onto the vertical pole 402.

Figure 5:
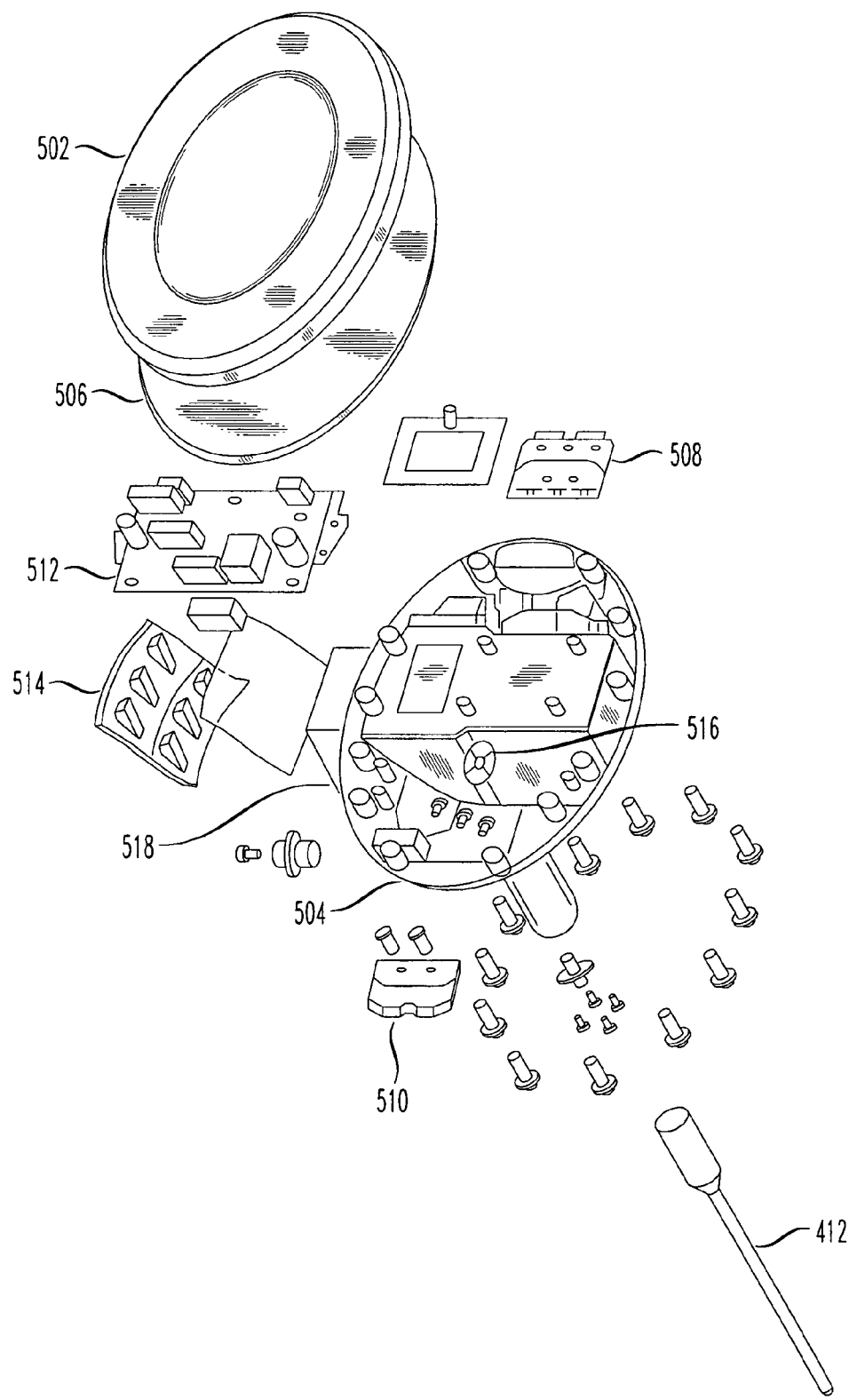
FIG. 5 illustrates an exploded isometric view of the access gateway and wireless router pod of FIG. 4 showing, in particular, internal components thereof.

Turning now to FIG. 5, illustrated is an exploded isometric view of the access gateway and wireless router pod of FIG. 4 showing, in particular, internal components thereof.

The weather-resistant housing 410 of FIG. 4 is a clamshell consisting of an upper shell 502 and a lower shell 504. A gasket 506 serves to seal the weather-resistant housing 410 when the upper and lower shells 504 are held together. First and second couplers 508, 510 are configured to act as a generic mechanical interface to receive a type of mounting bracket, whether it be the first type of mounting bracket 414 of FIG. 4 or another type.

First and second electronic modules 512, 514 reside within the upper and lower shells 502, 504. The first and second electronic modules 512, 514 may be an access gateway, a wireless router or any other appropriate module. Am antenna connection 516 leads to the antenna 412, allowing either or both of the electronic modules 512, 514 to use the antenna 412.

A battery compartment 518 is located in the lower shell 504 and allows batteries to be associated with the pod for backup purposes. Those skilled in the pertinent art are familiar with the ways in which batteries can be used for standby and backup power.

Figure 6:
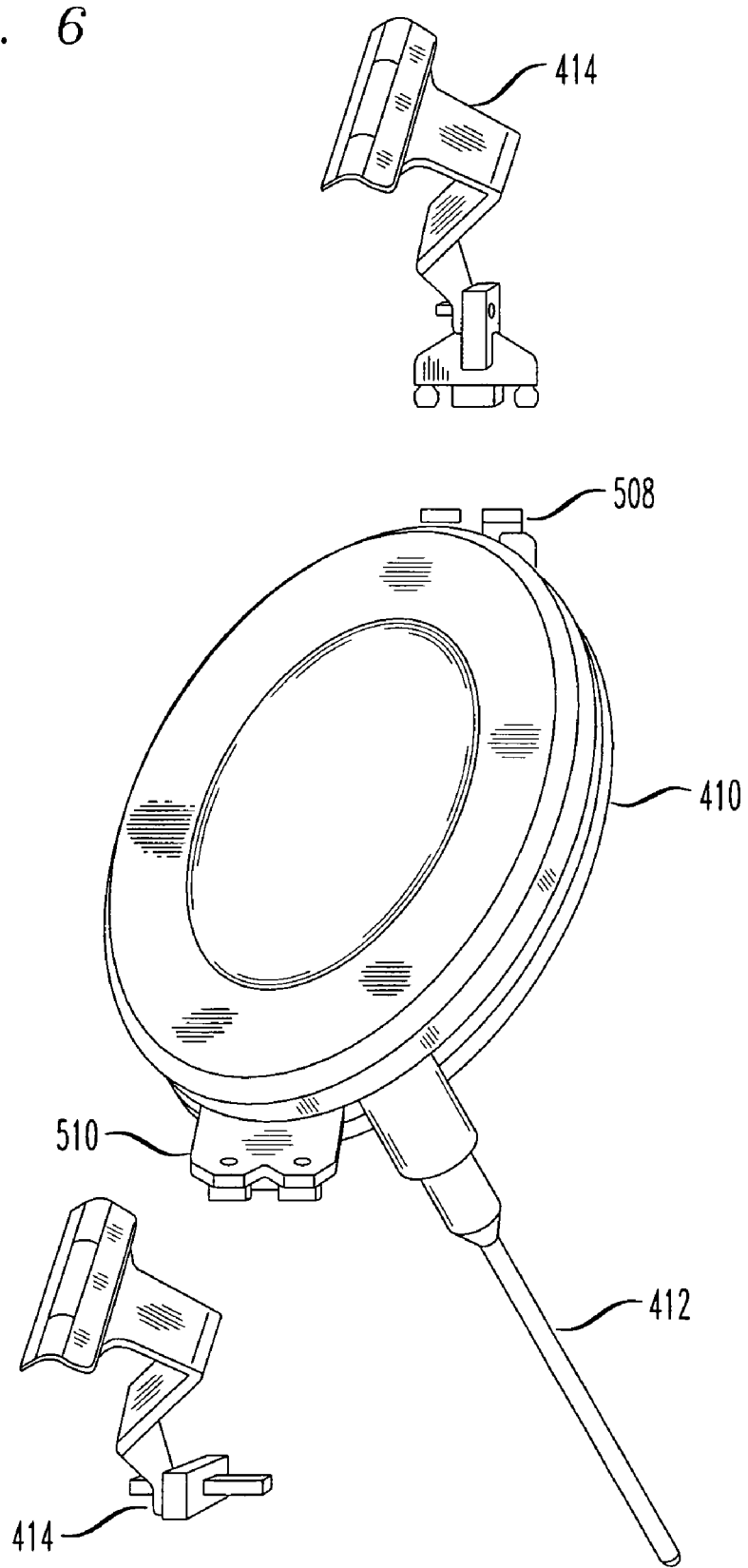
FIG. 6 illustrates a partially assembled isometric view of the access gateway and wireless router pod of FIG. 5 showing, in particular, a first type of mounting brackets therefor.

Turning now to FIG. 6, illustrated is a partially assembled isometric view of the access gateway and wireless router pod of FIG. 5 showing, in particular, the first type of mounting bracket 414 therefor. FIG. 5 is presented for the purpose of showing in greater detail the arrangement of the first and second couplers 508, 510 and a particular configuration of the first type of mounting bracket 414. It is apparent that the portions of the mounting bracket 414 mate with the couplers 508, 510 and can be pivoted or swiveled to accommodate mounting on a cross-member (e.g., the cross member 404 of FIG. 4) of a particular diameter or arc.

Figure 7:
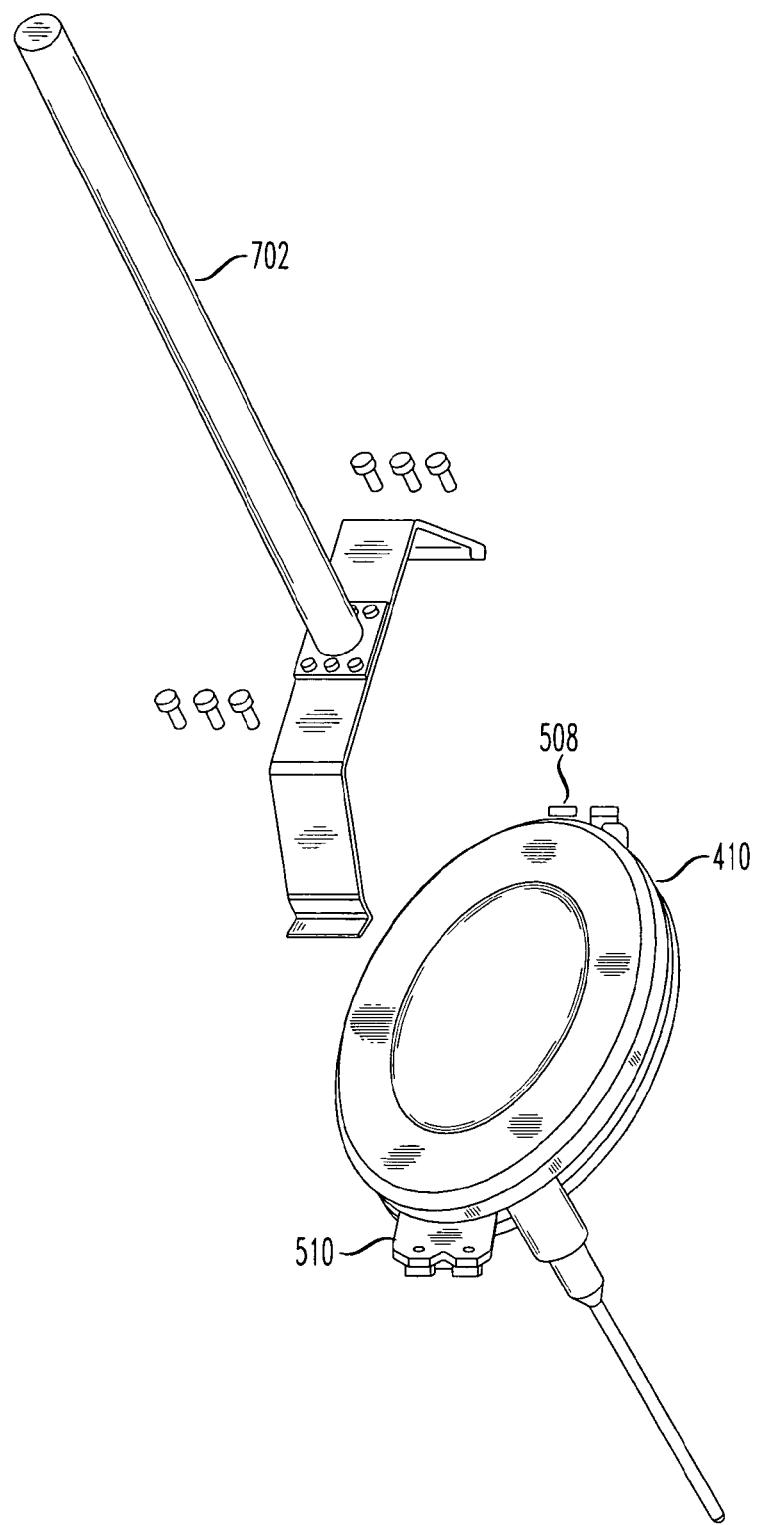
FIG. 7 illustrates a partially assembled isometric view of the access gateway and wireless router pod of FIG. 5 showing, in particular, a second type of mounting bracket therefor.

Turning now to FIG. 7, illustrated is a partially assembled isometric view of the access gateway and wireless router pod of FIG. 5 showing, in particular, a second type of mounting bracket 702 therefor. FIG. 7 is presented primarily for the purpose of showing that other types of mounting brackets may be used with the couplers 508, 510. Specifically, the second type of mounting bracket 702 may be used to suspend the pod under a traffic light or bridge that cannot accommodate the first type of mounting bracket 414 of FIG. 4. The second type of mounting bracket 702 may also be appropriate for mounting the pod on a building, bridge or any structure that requires welding the second type of mounting bracket 702.

Figure 8:
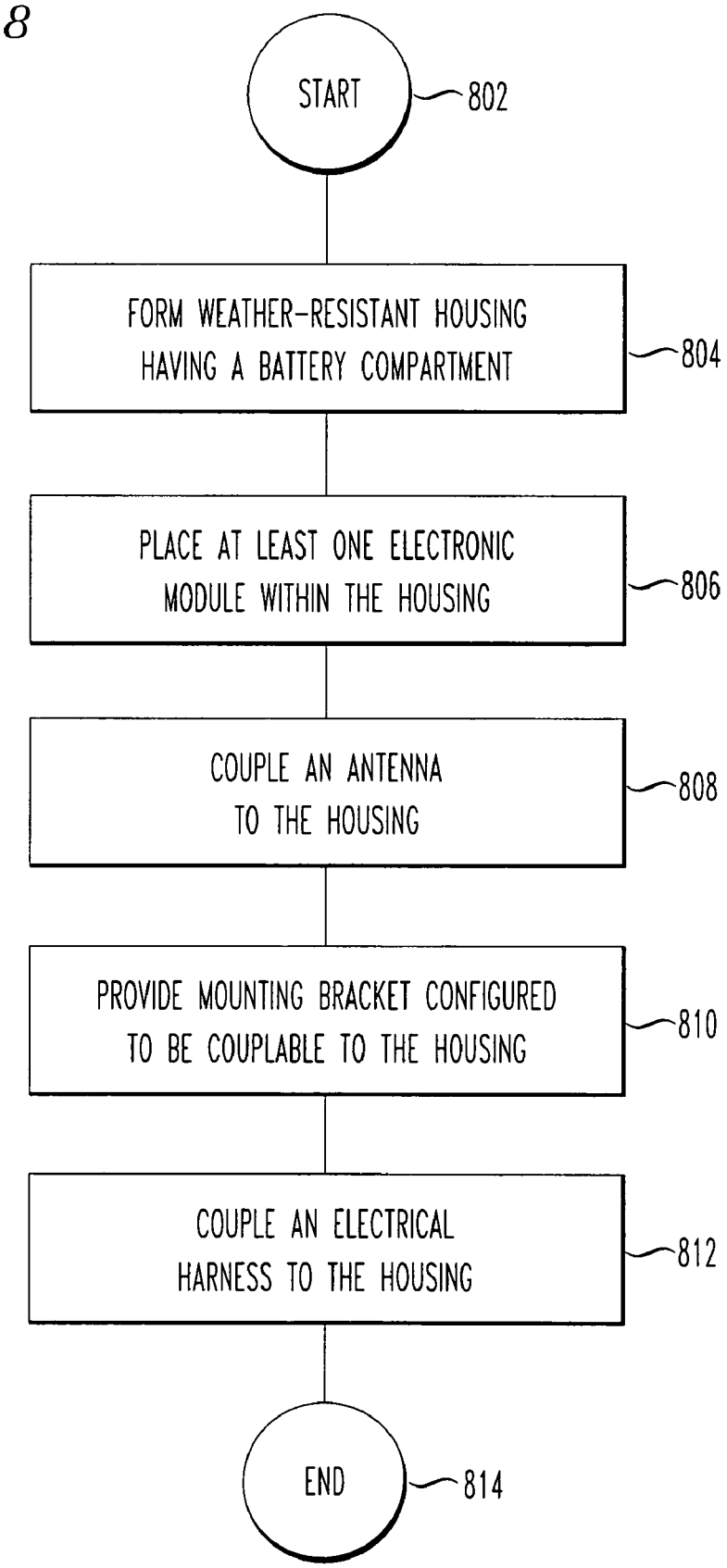
FIG. 8 illustrates a flow diagram of one embodiment of a method of manufacturing an access gateway and wireless router pod carried out according to the principles of the present invention.

Turning now to FIG. 8, illustrated is a flow diagram of one embodiment of a method of manufacturing an access gateway and wireless router pod carried out according to the principles of the present invention.

The method begins in a start step 802, wherein it is desired to manufacture an access gateway and wireless router pod. The method continues to a step 804 wherein a weather-resistant housing having a battery compartment is formed. In a step 806, at least one electronic module is placed within the housing. In a step 808, an antenna is coupled to the housing. In a step 810, a mounting bracket configured to be couplable to the housing and mount the housing to a fixture is provided. In a step 812, an electrical harness is coupled to the housing and configured to couple the at least one electronic module to a source of electric power associated with the fixture. The method ends in an end step 814.

Although the present invention has been described in detail, those skilled in the art should understand that they can make various changes, substitutions and alterations herein without departing from the spirit and scope of the invention in its broadest form.

What is claimed is:

1. An access gateway/wireless router pod for a public safety communications infrastructure, comprising:
   a weather-resistant housing having a battery compartment, said weather-resistant housing including first and second shells and a gasket located therebetween;
   a wireless router and an access gateway located within said housing;
   an antenna coupled to said housing and coupled to at least one of said wireless router and said access gateway through an antenna connection;
   a mounting bracket couplable to said housing and configured to mount said housing to a fixture; and
   an electrical harness coupled to said housing and configured to couple said wireless router and said access gateway to a source of electric power associated with said fixture.

2. The pod as recited in claim 1 wherein said mounting bracket includes first and second portions and said fixture is a streetlight.

3. The pod as recited in claim 1 wherein said battery compartment is externally configured to be accessible without opening said weather-resistant housing.

4. The pod as recited in claim 1 wherein said mounting bracket includes first and second portions and said fixture is a traffic light.

5. The pod as recited in claim 1 wherein said fixture is selected from the group consisting of:
   a building, and
   a bridge.

6. The pod as recited in claim 1 wherein said antenna is coupled to both of said wireless router and said access gateway through said antenna connection allowing both of said wireless router and said access gateway to use said antenna.

7. The pod as recited in claim 1 wherein said weather-resistant housing is a dielectric structure in the form of a clamshell.

8. A method of manufacturing an access gateway/wireless router pod for a public safety communications infrastructure, comprising:
   forming a weather-resistant housing having a battery compartment;
   placing at least one electronic module within said housing;
   coupling an antenna to said housing;
   providing a mounting bracket configured to be couplable to said housing and mount said housing to a fixture; and
   coupling an electrical harness to said housing and configured to couple said at least one electronic module to a source of electric power associated with said fixture.

9. The method as recited in claim 8 wherein said weather-resistant housing includes first and second shells and a gasket located therebetween.

10. The method as recited in claim 8 wherein said battery compartment is configured to be accessible without opening said weather-resistant housing.

11. The method as recited in claim 8 wherein said mounting bracket includes first and second portions and said fixture is selected from the group consisting of:
    a streetlight, and
    a traffic light.

12. The method as recited in claim 8 wherein said fixture is selected from the group consisting of:
    a building, and
    a bridge.

13. The method as recited in claim 8 wherein said at least one electronic module is selected from the group consisting of:
    an access gateway, and
    a wireless router.

14. The method as recited in claim 8 wherein said electrical harness includes an interface configured to interpose a lamphead and a sensor of said fixture.

* * * * *